(12) United States Patent
Gordeev et al.

(10) Patent No.: US 6,709,747 B1
(45) Date of Patent: Mar. 23, 2004

(54) METHOD OF MANUFACTURING A DIAMOND COMPOSITE AND A COMPOSITE PRODUCED BY SAME

(75) Inventors: Sergey Konstantinovitch Gordeev, St. Petersburg (RU); Sergey Germanovitch Zhukov, St. Petersburg (RU); Lija Vladimirovna Danchukova, St. Petersburg (RU); Thommy Ekström, Stockholm (SE)

(73) Assignee: Skeleton Technologies AG, Baar (CH)

( * ) Notice: Subject to any disclaimer, the term of this patent is extended or adjusted under 35 U.S.C. 154(b) by 200 days.

(21) Appl. No.: 09/748,308

(22) Filed: Dec. 21, 2000

Related U.S. Application Data

(62) Division of application No. 09/262,608, filed on Mar. 4, 1999, now Pat. No. 6,447,852.

(30) Foreign Application Priority Data

Sep. 28, 1998 (RU) ............................................. 98118300
Jan. 26, 1999 (RU) ............................................. 99100821

(51) Int. Cl.[7] ................................................. B32B 9/00
(52) U.S. Cl. ....................... 428/408; 428/325; 428/446; 428/697; 428/698; 428/699
(58) Field of Search ................................ 428/408, 446, 428/698, 699, 697, 325

(56) References Cited

U.S. PATENT DOCUMENTS

| | | | | |
|---|---|---|---|---|
| 4,124,401 A | * | 11/1978 | Lee et al. | 51/307 |
| 4,151,686 A | * | 5/1979 | Lee et al. | 51/307 |
| 4,220,455 A | * | 9/1980 | St. Pierre et al. | 51/295 |
| 4,242,106 A | * | 12/1980 | Morelock | 51/307 |
| 4,381,271 A | * | 4/1983 | Hayden | 51/295 |
| 4,453,951 A | * | 6/1984 | Ohno | 51/307 |
| 4,606,738 A | * | 8/1986 | Hayden | 51/295 |
| 4,664,705 A | * | 5/1987 | Horton et al. | 75/243 |
| 4,698,070 A | * | 10/1987 | Ohno | 51/307 |
| 5,266,236 A | * | 11/1993 | Bovenkerk | 252/503 |
| 6,179,886 B1 | * | 1/2000 | Gordeev et al. | 51/293 |

FOREIGN PATENT DOCUMENTS

| | | | | |
|---|---|---|---|---|
| EP | 43541 | * | 1/1982 | |
| EP | 56596 | * | 7/1982 | |
| EP | 196777 | * | 3/1985 | |
| RU | 2036779 | | 12/1992 | ............ B24D/3/02 |
| RU | 2064399 | | 1/1994 | ............ B24D/3/02 |
| RU | 2036779 | * | 6/1995 | |

* cited by examiner

*Primary Examiner*—Archene Turner
(74) *Attorney, Agent, or Firm*—Moser Patterson Sheridan

(57) ABSTRACT

The present invention relates to a method for manufacturing a diamond composite from diamond particles, comprising the steps of forming a work piece, heating the work piece and controlling the heating temperature and heating time so that a certain desired amount of graphite is created by graphitization of diamond particles, thereby creating an intermediate body, and infiltrating silicon or silicon alloy into the intermediate body. The invention also relates to a diamond composite produced by this method.

13 Claims, 9 Drawing Sheets

METHOD OF MANUFACTURING A DIAMOND COMPOSITE AND A COMPOSITE PRODUCED BY SAME

This is a division of application Ser. No. 09/262,608 filed Mar. 4. 1999 now U.S. Pat. No. 6,447,852.

FIELD OF THE INVENTION

The present invention relates to a method of manufacturing a diamond composite and a diamond composite produced thereby. This patent application is related to PCT patent application nos. PCT/EP98/04414 and PCT/EP98/05579, and to Russian Patent Application Nos. 98118300 filed Sep. 28, 1998 and 99100821 filed January 26, 1999, which are hereby incorporated by reference.

BACKGROUND OF THE INVENTION

There is a general need of extremely hard materials for many fields of application. These extremely hard materials are also called "superhard" when they exhibit a hardness of >40 GPa. These materials are used in a variety of applications such as tools for cutting, turning, milling, drilling, sawing, grinding operations, and the like. The hard materials may also be used for their wear, abrasion and erosion resistance when working as bearings, seals, nozzles or in similar cases. The materials may be working on, or being in contact with, many materials such as cast iron, steel, non-iron metals, wood, paper, polymers, concrete, stone, marble, soil, cemented carbide and grinding wheels of aluminum oxide, silicon carbide, diamond, cubic boron nitride, and the like. As being the hardest material known, mono- or polycrystalline diamond is suitable for these purposes. Other common materials used for their hardness are for instance cubic boron nitride (CBN), boron carbide and other ceramics and cemented carbides, however only diamond or CBN containing materials can reach the superhard group of materials.

It is well known that carbon in the diamond structural form is thermodynamically unstable at ambient temperatures and pressures. Nevertheless the decomposition of diamond to graphite (graphitization) is hindered by kinetic reasons and diamonds found in nature have existed for millions of years. However, by increasing the temperature, graphitization of diamond crystals will occur with a process starting from the surface, where the energy to overcome the kinetic hindrance is highest and where defects or catalytic effects from other surface impurities or the atmosphere will influence this process.

By heating in air it is well known that the decomposition and oxidation of diamonds will take place at temperatures as low as 600–700° C. Carbon solving metals like cobalt may catalyze a reaction already at about 500° C. The graphitization process is delayed to higher temperatures in vacuum or inert atmosphere and diamonds are most stable in hydrogen gas atmosphere, where the environment is strongly reducing—High quality diamond is stable for long times to about 2000° C.

Different composite bodies with bonded diamond particles are known. The diamond particles may be bonded by a matrix comprising metal and/or ceramic phases and produced by sintering diamond particles in a matrix of such materials, or bonded by the infiltration of silicon or silicon alloys into the diamond body, for instance.

By heating a body of diamond powder in a furnace to high temperatures during extended times, a small amount of uncontrolled and undesirable graphitization might occur depending also on the pressure. In previously reported processes to form densely sintered diamond composite bodies this has been an unwanted effect and different ways of avoiding this have been used. The most practiced technique is to use high pressures during the sintering step and stay in the diamond stable area of the phase diagram at 1300–1600° C., in high-pressure chambers with pressures of 30.000–60.000 atm (HP/HT). See for instance FIG. 4, in U.S. Pat. No. 4,151,686; for a diamond-graphite phase diagram.

The required extremely high pressures are only achieved by specially made presses and dies. The consequences are high production costs, limited production capacity and limited shapes and sizes of the diamond composite bodies.

There are also methods for production of diamond bodies using lower pressures than needed for the diamond stable area, from about a minimum of 500 psi (about 34 bars) and above, e.g. the method according to U.S. Pat. No. 4,124,401.

In the case where the pressure has been in the graphite stable region, for instance using a furnace with protective inert atmosphere, graphitization has been minimized by using short times at high temperature or reducing the sintering temperature for solidification of the body. An example of the latter is to use metal alloys of silicon that have a significantly lower melting temperature than that of pure silicon.

Several patents reveal techniques to produce materials containing diamond, silicon carbide and silicon without using high pressures. There are a number of variations of the process, mainly concerning the use of different carbonaceous materials (hereafter referring to all kinds of non-diamond carbon materials like carbon black, carbon fibres, coke, graphite, pyrolytic carbon etc). In principal the following steps are followed.

A. Non-coated diamond particles or normally, carbon-coated diamond particles and carbonaceous materials are used as precursor materials. According to the examples, U.S. Pat. No. 4,220,455 starts with adding a thin layer (500–1000 Angstrom) of carbon on the diamonds by a pyrolytic reaction. The pyrolysis is done in vacuum for a few minutes by feeding natural gas or methane, into a furnace with diamond particles at 1200° C. Sometimes diamonds without a pyrolytic carbon layer are used, as in U.S. Pat. No. 4,381,271, EPO 0 043 541, EPO 0 056 596 and JP 6-199571A. Both carbon-coated and non-coated diamonds are mixed with carbonaceous materials as a main source of carbon e.g. carbon black, short carbon fibres or cloth and a binder etc. before the forming of green bodies.

B. Forming of green bodies of the diamond particle/carbon material mixture is done in a mould. The green bodies contain additionally solvents and temporary or permanent binders to facilitate the forming and to increase the strength of the green body.

C. Work-pieces are made by heat treating the green bodies. Some binders are vaporised without leaving any residues e.g. paraffin, other binders are hardened leaving a carbonaceous residue in the work-piece, e.g. phenol-formaldehyde and epoxy resins.

D. Infiltration of the porous work-piece with molten silicon is done to form silicon carbide in a reaction between the carbon and the silicon. The heat treatment is done in such a manner as to minimise the graphitization of diamond, which is considered harmful. In the examples of U.S. Pat. No. 4,220,455 silicon is infiltrated in vacuum when the body is in a mould, at a temperature between 1400–1550° C. for 15 minutes, during which time the reaction between silicon and carbon is completed. U.S. Pat. No. 4,242,106 uses a vacuum of 0,01–2,0 torr during the infiltration. The required time, depending largely on the size of the body, is determined empirically and takes about 15–20 minutes at a temperature above 1400° C., or 10 minutes at 1500° C. U.S. Pat. No. 4,381,271 uses carbon fibres to promote the infiltration of fluid silicon by a capillary action. In most of the patents infiltration is made in a mould. In some earlier patents the infiltration is made outside the mould, like in EPO patent 0 043 541.

Not only silicon has been used for the infiltration and bonding of diamond particles. Several patents describes using silicon alloys instead of pure silicon. U.S. Pat. No. 4,124,401 describes a hot-press method using an eutectiferous silicon alloy for infiltration. U.S. Pat. No. 5,266,236 uses a boron-silicon alloy in a HP/HT method. U.S. Pat. No. 4,664,705 discloses a method that infiltrates a silicon alloy through a PCD body, where the binder has earlier preferably been leached out.

The processes where carbon-coated or non-coated diamonds are mixed with carbonaceous materials might have disadvantages, e.g. difficulties in preparing homogeneous mixtures of these materials, difficulties of silicon infiltration due to very small pore sizes and necessity of special equipment for preparing homogenous mixtures.

In the patent RU 2064399 the addition of carbon by pyrolysis is done only after the forming and production of the work-piece. A preformed work-piece of diamond particles or a mixture of diamond particles and carbide grains as filler, is produced with a temporary binder. The binder is evaporated and the work-piece is placed in a reactor, where pyrolytic carbon is deposited on all grains of the body by a pyrolytic reaction from a gas phase, e.g. methane at 950° C. for 10 h. After this follows silicon infiltration. The drawbacks of this process are the use of a great amount of hydrocarbon gas and that the processing time is rather long. If carbide grains are used as fillers, the same problems of homogenisation as mentioned above appear.

There are some methods for improving the diamond composite materials produced by the earlier described techniques. One of them is to arrange the diamond particles as graded structures of concentration and size in the material, thereby affecting some properties and also the field of application. A method of making a size graded material by sintering at high pressure and high temperature is disclosed in the patent EPO 0 196777. The grain size and/or packing density are varied in layers between the front face and rear face to get different wear resistance in these parts. The drawback of this method is that since it uses high pressure-high temperature, the production of the material is more expensive and requires special equipment and there are size limitations.

There are also a number of patents using different amount of diamond in different parts of the composite body. The following patents U.S. Pat. No. 4,242,106; U.S. Pat. No. 4,247,304; U.S. Pat. No. 4,453,951; EPO 0 043 541; EPO 0 056 596 describe the production of layered structures of a final material with a diamond composite layer in contact with a supporting silicon carbide or silicon carbide-silicon substrate, for instance. U.S. Pat. No. 4,698,070 describes the production of a composite with a diamond containing portion and a core portion united by a matrix of silicon carbide and silicon. Additional particle layers with other diamond concentration may also be provided and placed e.g. in corners, on the top, in the core.

Generally the drawback of layered materials with different diamond size or concentration is that there may be differences in physical/mechanical properties in the diamond containing and supporting layers, e.g. thermal expansion coefficient and E-modulus, might cause unwanted stress situations at the interface and thereby weaken the composite under stress. Diamonds have a relatively low tensile strength and low toughness, and a distinct difference in diamond content in different parts joined by an interlayer may also affect the fracture resistance of composites. None of the methods described earlier result in bodies with prior specified distribution of diamond particles of different size throughout the material volume, with uniformly changing properties.

The composites of U.S. Pat. No. 4,220,455 consist of a mixture of diamond particles of different size in the whole body, i.e. the composite does not have layered structures. The particular sizes used are chosen depending on the desired packing of particles and resulting body. For most abrasive applications particles no greater than about 60 $\mu$m are preferred. Preferably to maximise the packing of the particles they should contain a range of sizes, i.e. small, medium and large.

None of the methods described above use graphitization intentionally. Instead the graphitization is considered as harmful and unwanted.

In RU patent 2036779 a preform is moulded of diamond powder eventually together with water or ethyl alcohol, placed in a furnace and impregnated with liquid silicon at 1420–1700° C. in argon or vacuum. In the process the surface of the diamond grains is minimally graphitized, so the greater part of the diamond is still unchanged. This minor amount of graphite, reacts in contact with infiltrated silicon creating a thin surface layer of silicon carbide that keeps back any further formation of diamond to graphite during the used process. The drawback of this process is poor control and there is no method for governing the amount of produced SiC, residual silicon or porosity left in the composite.

Thus in these previous patents there is no teaching about a well-controlled step of adding carbonaceous materials to a diamond body and intentional graphitization step for production of materials with desired amount of diamond, silicon carbide and silicon, with low porosity and no graphite.

SUMMARY OF THE INVENTION

In contrast to these previous approaches, one important step in the process to prepare a diamond composite according to the present invention is to use a desirable and controlled graphitization that deliberately transforms a layer of intended thickness at the surface of the diamond particles to graphite. Graphitization is a complex process depending not only on the important time-temperature curve of the process, but also on the diamond particle size, type and quality of diamond, presence of catalytic impurities, the atmosphere, presence of oxygen, pressure etc. Smaller particles have a larger relative surface area than coarser particles and surface defects and type of diamond are all important parameters. Presence of carbon-soluble metals like cobalt, nickel or iron and the presence of oxygen or oxidizing atmosphere (e.g. carbon monoxide) will have a great influence. Therefore, for a certain starting material, furnace and given process parameters it is important empirically to carefully determine the degree of graphitization. This knowledge will provide the background for an appropriate time-temperature curve for governing the graphitization in a controlled and safe way during production.

In the present inventive process, by changing the relative amount of graphite in the diamond body before the infiltration of silicon or silicon alloy melt, it is possible to prepare a desired phase composition, microstructure and, subsequently, control the material properties. The graphite layer on the diamond particles shall have uniform coverage. The minimum amount of graphite in such layers should allow formation of strong chemical bonding by SiC formation between diamond interfaces and the matrix. The amount of formed SiC shall also be enough to form a tight protective layer. For micron sized or larger diamond particles the graphitization should be at least more than approximately 3 wt-% and preferably lie between approximately 6–30 wt-%, as discussed in detail below.

In most diamond composite bodies produced in the prior art it has been attempted to use very high diamond concentrations to form a direct chemical bonding between the diamond particles, i.e. giving a diamond skeleton structure. This has been supposed to increase the mechanical strength and rigidity of the composites. Surprisingly we have found that such a direct bonding is not needed to achieve good mechanical properties. A direct bonding of the diamonds is not an important or needed factor in our diamond composites, although at the highest diamond concentrations some diamond to diamond contact might occur.

In the process according to the present invention in case of using pure silicon as the infiltrate melt into a diamond body, the products besides diamond will be silicon carbide and residual silicon filling the porosity and resulting in a fully dense body. Materials properties like hardness, toughness and rigidity will be influenced by the amount, distribution and particle size of the different phases.

However, by using a silicon alloy a more complex material will be formed with wider possibilities to prepare materials with desired overall properties for different applications. Besides the phases mentioned above the alloying element could form either carbides with the non-diamond graphite present at the initial stage of the process or form a metal silicide. Residual silicon alloys of varying composition (or even silicon) will be present or small amounts of metal carbosilicides might form.

Boron carbide ($B_4C$), which is harder than silicon carbide will form resulting in a harder final body, when using boron as an alloying element in silicon. Other strong carbide formers like Ti, Zr, Nb and Ta are predicted from Gibbs energy calculations to form metal carbide rather than metal silicide. The presence of these carbide particles in the microstructure could increase the toughness and not deteriorate high temperature properties. However, kinetic factors might cause some silicide formation. The presence of metal silicides will increase the toughness at low and medium temperatures, but some silicides like those from the iron group will not be beneficial for high temperature use above 1000° C. Other suicides like molybdenum disilicide are known to have good high temperature properties especially in air where initial oxidation forms a silica layer protecting from further oxidation.

The process according to the present invention is a low-pressure process considerably below the pressures required for the diamond stable region and will allow low-cost mass production also of large and/or complex bodies. A novel feature of our production process is that it does not need special presses and dies. For example we do not need to use expensive hot isostatic pressing (HIP) equipment for gas pressures up to 2 kbar. In this case, both the HIP equipment and running costs of the process are very high and the process requires a gas-tight metal, glass or other encapsulation for transferring the pressure to the bodies to be sintered. Stringent safety precautions are in force when using such high gas pressures, and during operation and maintenance of such equipment.

Hot pressing (HP) equipment is available at lower costs where pressures typically from 30 to 1500 bars, are applied to the diamond body by graphite punches during sintering. The production capacity is limited and the sintered bodies are most likely in the form of discs or plates. Complex shaped bodies for engineering purposes cannot be prepared easily with prior art methods. The present invention avoids these limitations.

From a production cost point of view the pressure used should be below approximately 50 bar, preferably below approximately 30 bar. At this pressure very much simpler production equipment can be used and complex shapes can be made.

The lowest production cost and large-scale manufacture is achieved with furnaces using ambient pressure of inert gas or a slight overpressure less than 2 bars. Vacuum can also be used. High production capacity lowers costs drastically and the sizes of the composite components can be increased.

The use of nitrogen as a low-cost inert gas is possible in the latter case as a low pressure gas. However, increasing nitrogen pressure above 2 bars at the melting temperature of silicon or silicon alloys might cause a dramatic reaction between silicon and nitrogen to form silicon nitride. This reaction is strongly exothermic and once started in might be uncontrolled increasing local temperatures destroying the diamonds and the composite.

The principle object of the present invention is the process for making diamond composites having excellent properties, and the superhard material produced thereby. The method should be easily performed, fast and cost effective and offer possibilities to control several properties and cost of the final materials.

An object of the invention is obtained by a low pressure method for manufacturing a diamond composite, where the diamond particles are bonded by a matrix comprising silicon carbide and silicon, or alternatively combinations of the following material phases; silicon carbide; other carbides such as metal carbide or boron carbide; silicon; metal silicides, metal carbosilicides and/or silicon alloys; comprising the steps of forming a work piece, heating the work piece and controlling the heating temperature and heating time so that a certain desired amount of graphite is created by graphitization of diamond particles, thereby creating an intermediate body, and infiltrating silicon or alternatively a silicon alloy into the intermediate body.

In a preferred embodiment the amount of graphite created by graphitization is approximately 1–50 wt-%, preferably 6–30 wt-% of the amount of diamond and the heating temperature during graphitization is lower than 1700° C. The heating temperature and heating time needed for the graphitization is empirically determined for the heating equipment used. The work piece is formed with a porosity of approximately 25–60 vol-%.

In a another embodiment of the present invention a certain amount of carbon is deposited in the work piece by exposing it to a gaseous hydrocarbon or gaseous hydrocarbons at a temperature exceeding the decomposition temperature for hydrocarbon or hydrocarbons, and at least some graphitization of the diamond crystals is done before exposing the work piece to a gaseous hydrocarbon or gaseous hydrocarbons at a temperature exceeding the decomposition temperature for hydrocarbon or hydrocarbons.

The intermediate body can be machined into the desired shape and size of the final body before the step of infiltration of liquid silicon or silicon alloy.

In a further embodiment the intermediate body is heated together with silicon or silicon alloy that is vaporised, and the body is then machined into the desired shape and size of the final body before the step of infiltration of liquid silicon or silicon alloy.

Infiltrating a silicon alloy into the intermediate body is characterized in that the melt is silicon alloy comprising at least one metal from the group consisting of: Ti, Zr, Hf, V, Nb, Ta, Cr, Mo, W, Mn, Re, Fe, Co, Ni, Cu, Ag, Al, or the element B or Ge. When referring to metals Germanium (Ge) is considered as a metal. The heat treatment and infiltration of the diamond containing work-piece are performed at a pressure of less than approximately 50 bars of an inert gas, preferably below 30 bars, and most cost efficient below 2 bars inert gas pressure or in vacuum. The infiltration is carried out at temperatures higher than the melting temperature of the melt, i.e. at temperatures higher than 1450° C. for most of the silicon alloys or at temperatures higher than 1100° C. when using alloys containing Al, Cu, Ag, Fe, Ni, Co, Mn, or Ge. The temperature of the infiltration should be kept less than 1700° C., preferably less than 1600° C.

It is possible to make silicon alloys with the aforementioned alloy metals or boron or germanium. Their liquidus temperatures are low, which is important. The graphitization process is better controlled and these silicon alloys have moderate vapor pressure at temperatures in the interval 1200–1700° C. Finally, elements from the selected alloying elements form additional phases in the material which gives the diamond composite valuable properties. These phases can be metal carbides, metal suicides, metal alloys with silicon or ternary metal carbosilicides, or the corresponding phases of boron.

Good results are obtained when using silicon alloys, in which content of alloying element in the silicon allow is as follows:

from Ti, Zr, or Hf is less than 50 wt-%, preferably less than 20 wt-%.

from V, Nb, or Ta is less than 20 wt-%, preferably less than 10 wt-%.

from Cr and Re is less than 45 wt-%, preferably less than 20 wt-%.

from Mo and W is less than 10 wt-%, preferably less than 5 wt-%.

from Mn, Fe, Co, or Ni is less than 60 wt-%, preferably less than 20 wt-%.

from Cu and Ag is less than 30 wt-%, preferably less than 15 wt-%.

from Al and Ge is less than 50 wt-%, preferably less than 20 wt-%.

from B is less than 20 wt-%, preferably less than 8 wt-%.

Infiltration of liquid silicon alloys into the intermediate body is performed by the most suitable methods, for example, by melting of the corresponding alloy directly on the surface of intermediate body, or, for example, by dipping of intermediate body in the corresponding melt or, for example, by pouring of the corresponding melt on surface of intermediate body. When using alloys it ensures simple infiltration process connected with the lower melting temperature of alloys compared with individual substances, better wetting of the intermediate body surface, a lower viscosity and more intensive penetration into pores of the intermediate body. As a result of infiltration a practically non-porous material comprising diamond, silicon carbide and additional phases, content of which is determined by the type of the used metals in the alloy, is produced. Such additional phases can be metal silicides (for example $NiSi_2$) and/or metal carbides (for example TiC and NbC) and /or alloys of metals (for example Ag) with silicon.

Content of metals (besides silicon) in the final dense diamond composite is less than approximately 30 wt-%, preferably less than 20 wt-%. For some metals the content is naturally limited by the composition of the used silicon alloy and the maximal porosity of the initial work-piece. Thus, for metals from the group of V, Nb, or Ta their content in material is less than 10 wt-%, preferable less than 5 wt-%. For metals from the group of Mo and W their content in material is less than 5 wt-%. Finally, for the metals Fe, Co, and Ni the material content should preferably be less than 10 wt-%.

The work piece can be formed with a uniform or non-uniform distribution of diamond particles with various sizes and qualities. For instance, the diamond particles in the work piece can be distributed in successively decreasing sizes from the surface of the work piece towards the centre thereof. The work piece can in a variant be formed from a homogeneous mixture of diamond crystals of various sizes eventually with the addition of a binder.

In yet another embodiment two or more work pieces are made separately and thereafter being brought together before the heat treatment and the infiltration steps.

The forming of the work piece may be made in a mould, the heat treatment and the infiltration of silicon or alternatively silicon alloy being made after the work piece has been taken out of the mould.

The forming of the work piece may be made in a mould, the heat treatment and the infiltration of silicon or silicon alloy being made having the work piece in a mould.

The invention also relates to a body in which diamond particles are bonded to a matrix of silicon carbide, said body comprising at least approximately 20 vol-% of diamond particles, at least 5 vol-% of silicon carbide, preferably more than 15 vol-% of silicon carbide, and silicon or other metal-silicon-carbon or boron-silicon-carbon phases, the Young's modulus exceeding 450 GPa.

In another embodiment, said body comprising at least approximately 29 vol-% of diamond particles, at least approximately 14 vol-% of silicon carbide, and silicon or other metal-silicon-carbon or boron-silicon-carbon phases, the Young's modulus exceeding 540 GPa.

In a preferred embodiment, said body comprises at least approximately 46 vol-% of diamond particles having sizes of about 30 µm at the most, the Young's modulus exceeding 560 GPa.

In another preferred embodiment, said body comprises at least approximately 54 vol-% of diamond particles, at least 60 vol-% of the diamond particles having sizes of at least 50 µm, the Young's modulus exceeding 650 GPa.

In all these embodiments the body maintains its shape and its Young's modulus up to a temperature of at least 1500° C. in vacuum.

In a further embodiment, diamond particles of sizes of about 10 µm or less are embedded and included in the matrix, the Vickers microhardness of the matrix measured in the area between the diamond particles being greater than 30 GPa for a load of 20 N, the Knoop macrohardness of the matrix being greater than 36 GPa for a load of 20 N.

In another embodiment the diamond particles have one size fraction of particles being larger than about 50 µm and one sizes fraction of particles having a size of 50 µm at the most, the mass ratio falling in the range of about 0.25 to 2.5 and the mean particle size being larger than 10 µm, preferably larger than 20 µm.

In yet another embodiment the diamonds have one size fraction of particles being large diamond particles and one size fraction being small diamond particles, the mass ratio falling in the range of about 0.25 to 2.5 and the mean particle size being larger than 10 μm, preferably larger than 20μm.

In a further embodiment the diamond particles have one size fraction being large diamond particles and one size fraction being small diamond particles, the abrasion rate being less than approximately 26 μm$^3$/m, preferably less than 10 μm$^3$/m (example 10).

In a further embodiment the diamond particles have one size fraction being large diamond particles and one size fraction being small diamond particles, the erosion rate being less than approximately 0.34 mg/g, preferably less than 0.25 mg/g (example 10).

In a further embodiment the diamond particles have sizes less than about 20 μm, the abrasion rate being less than 26 μm$^3$/m, preferably less than 10 μm$^3$/m (example 10).

In a further embodiment the diamond particles have sizes less than about 20 μm, the erosion rate being less than 0.34 mg/g, preferably less than 0.25 mg/g (example 10).

In a variant of the embodiments the body is hollow.

In a further embodiment a surface of the body is coated with diamond film.

In yet another embodiment, the body comprises large diamond particles of a size larger than 20 μm, the matrix comprising 0–50 vol-% of small diamond particles having sizes less than 20 μm, 20–99 vol-% of silicon carbide, and 1–30 vol-% silicon or other metal-silicon-carbon or boron-silicon-carbon phases, the matrix hardness being 20–63 GPa.

In a first variant, the matrix hardness is 20–30 GPa. In a second variant, the matrix hardness is 50–63 GPa. In a third variant, the matrix hardness is 30–50 GPa.

BRIEF DESCRIPTION OF THE DRAWINGS

The invention will now be described with reference to the enclosed Figures, of which.

FIGS. 7A1 and 7A2 show scanning electron micrograph pictures of abraded surfaces of two different samples produced by infiltration of silicon.

DETAILED DESCRIPTION OF THE INVENTION

The principal object of the present invention is to manufacture diamond composites having excellent properties with an uncomplicated method in a fast, cost effective and controllable way. The invention comprises several principles:

The process uses diamond graphitization intentionally instead of avoiding it.

Gradients or parameter variations of different kind are used to control both final properties of the product and manufacturing costs.

Using preforming and near net-shaping technique combined with strengthening of the intermediate body to enable machining to complicated final body shapes and to avoid expensive and difficult machining operations of the infiltrated body.

A low pressure method, not needing complicated equipment needed for methods using higher pressures.

Low cost production of large bodies and of large batches of products.

In the process according to the present invention, diamonds of any size may be used. By submicron sized diamonds is meant diamond particles smaller than 1 μm and by small diamonds diamond particles smaller than 20 μm and more preferably smaller than 10 μm. Large sized diamonds, >20 μm, are used in several applications. For high mechanical strength, especially in engineering components, the size of diamond particles used shall preferably be smaller than 20 μm. Very large diamonds with sizes larger than 60 μm are used for their abrasive ability, often in combination with small diamonds.

THE PROCESS; INTENTIONAL USE OF DIAMOND GRAPHITIZATION AND OPTIONALLY IN COMBINATION WITH USE OF PYROLYTIC CARBON

The material according to the present invention is achieved by a process that uses graphitization of diamond, optionally combined with pyrolytic deposition of carbon, for production of diamond composites. This signifies that the invention uses diamond graphitization, i.e. partial diamond transformation into graphite efficiently and in a planned and controlled manner.

Figure 1:
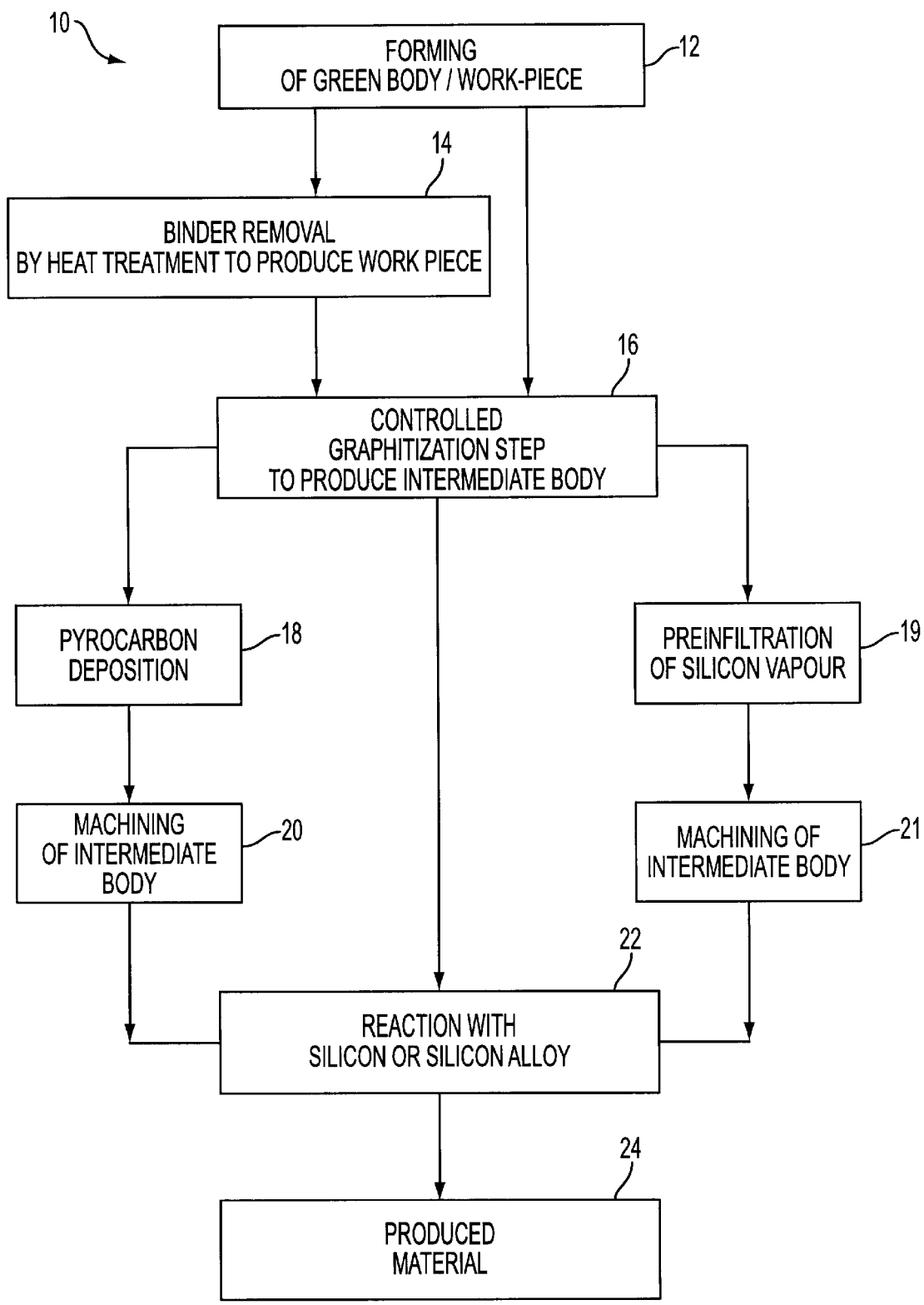
FIG. 1 shows the preferred steps of the method according to an embodiment of the present invention in a flowchart.

FIG. 1 describes the preferred process steps 10 in a flowchart. The different steps of the process according to the present invention are described by the following:

Forming of a green body is done from a mixture of diamond particles of various sizes together with a small amount of a temporary or permanent binder, or alternatively without using a binder, in the Forming step 12. The forming is done using established techniques, for instance by pressing, using slip and slurry casting, injection moulding etc. In the case when a mould is used for forming, the green body is usually removed from the mould.

Production of a work-piece is done by evaporating or hardening and decomposing the present solution agents and/or binders in the green body in the Binder Removal step 14. If a green body is produced without any binders it is considered as a work-piece in which case the Binder Removal step 14 is omitted, and instead the process proceeds directly to the Controlled Graphitization step 16. The final amount of binder in the work piece is approximately 5 wt-% or less. For provision of a uniform and controllable graphitization throughout the whole work-piece volume, it is undesirable to have impurities from the binder present therein. These may catalyse or inhibit the graphitization process. A reason for having not less than approximately 95 wt.-% diamonds in the work-piece is that precise control of the amount of carbon that will be present and where, is only possible in a body without fillers, and for a minimum amount of binder.

Heat treatment of a work-piece for obtaining an intermediate body. The work-piece with a diamond content of 95–100 weight % of the total mass is heat treated to obtain an intermediate body, by using controlled graphitization of diamond, or optionally a combination of controlled graphitization of diamond and deposition of pyrolytic carbon, hereinafter referred to as "pyrocarbon," in the Controlled Graphitization step 16. When combined, it is preferred to use graphitization prior to pyrocarbon deposition.

Graphitization for obtaining an intermediate body. During graphitization the work-piece (or the intermediate body with deposited pyrocarbon) is heat treated in vacuum or in a controlled atmosphere, preferably an inert gas at 700–1900° C., preferably at 1000–1700° C., and best controlled at 1100–1500° C. Usually graphitization is slow at temperatures lower than 1000° C., but may proceed at even lower temperatures depending on catalytic effects, the atmosphere and equipment used, for instance. At temperatures higher than 1900° C. the rate of graphitization is so high that it will be difficult to control with required precision, especially when using low quality diamonds. The vacuum pressure is preferably lower than 1 mmHg. As inert gas nitrogen, argon (or other noble gases), hydrogen or helium may be used, which provides for the absence of oxygen in the system. The process is not restricted to using any specific pressures, but can be used in a wide pressure range. So the inert gas pressure is less important and is chosen according to applicability of the process, e.g. 760 mmHg. A low pressure is preferred for various reasons, e.g. economical, industrial, and efficiency reasons.

After the Controlled Graphitization step 16, different embodiments of the present invention may be employed. In one embodiment, pyrolytic deposition of carbon into the graphited intermediate body is performed at Pyrocarbon step 18:

Pyrolytic deposition of carbon into the graphitized intermediate body. During pyrolytic deposition of carbon into the graphitized intermediate body (or into the work-piece), the body is exposed to a gas of hydrocarbon or hydrocarbons at a temperature that exceeds the decomposition temperature for the current gas or gases, for example natural gas at 750–950° C., or gas containing acetylene, methane, ethane, propane, pentane, hexane, benzene and their derivatives at 510°–1200° C. The deposition of pyrocarbon strengthens the intermediate body and allows machining of the intermediate body if desired at step 20.

In an alternative embodiment, the graphitized intermediate body may be subjected to pre-infiltration at Preinfiltration step 19:

Pre-infiltration of the intermediate body may be done in order to increase the strength and to allow machining (at step 21) of an intermediate body, as an alternative to the pyrocarbon deposition. Partial pre-infiltration is achieved by a variety of means, for example by heating the intermediate body together with silicon/silicon alloy that is thereby vaporised, or by a chemical vapour deposition (CVD) method using organic silanes, such as the methylchlorosilane family. The strength of such a body can be controlled by the amount of silicon/silicon alloy that is allowed to react with the graphite The infiltration of silicon or silicon alloys into the intermediate or pre-infiltrated body is performed in the Reaction with Silicon or Silicon Alloy step 22, and is carried out by well-known methods to provide the Produced Material at step 24. The infiltration may preferably be done outside of a mould for instance by melting solid silicon or silicon alloy, or by liquid silicon or silicon alloy feeding on an outer surface of an intermediate or pre-infiltrated body, by using differential vacuum infiltration techniques or by dipping the intermediate or pre-infiltrated body into liquid silicon or silicon alloy. There is also a possibility to apply the silicon or silicon alloy partly or fully by infiltration of vaporous silicon or silicon alloy, or by chemical methods, for instance by using techniques similar to sol-gel, chemical vapour deposition etc, followed by a high temperature reaction.

Infiltrating a silicon alloy into the intermediate body characterized in that said melt is silicon alloy comprising at least one metal from the group consisting of Ti, Zr, Hf, V, Nb, Ta, Cr, Mo, W, Mn, Re, Fe, Co, Ni, Cu, Ag, Al, or the element B or Ge. When referring to metals, Germanium (Ge) is considered as a metal. The heat treatment and infiltration of the diamond containing work-piece is performed at a pressure of less than approximately 50 bars of an inert gas, preferable below 30 bars, and most cost efficient below 2 bars inert gas pressure or in vacuum. The infiltration is carried out at temperatures higher than the melting temperature of the melt, i.e. at temperatures higher than 1450° C. for most of the silicon alloys or at temperatures higher than 1100° C. when using alloys containing Al, Cu, Ag, Fe, Co, Ni, Mn, or Ge. The temperature of the infiltration should be kept less than 1700° C., preferably less than 1600° C.

It is possible to make silicon alloys with the aforementioned alloy metals or boron or germanium. Their liquidus temperatures are low, which is important. The graphitization process is better controlled and these silicon alloys have moderate vapor pressure at temperatures in the interval 1200–1700° C. Finally, elements from the selected alloying elements form additional phases in the material which gives the diamond composite valuable properties. These phases can be metal carbides, metal silicides, metal alloys with silicon or ternary metal carbosilicides or the corresponding phases of boron.

Good results are obtained when using silicon alloys, in which the content of alloying element in the silicon alloy is as follows:

from Ti, Zr, or Hf is less than 50 wt-%, preferably less than 20 wt-%.

from V, Nb, or Ta is less than 20 wt-%, preferably less than 10 wt-%.

from Cr and Re is less than 45 wt-%, preferably less than 20 wt-%.

from Mo and W is less than 10 wt-%, preferably less than 5 wt-%.

from Mn, Fe, Co, or Ni is less than 60 wt-%, preferably less than 20 wt-%.

from Cu and Ag is less than 30 wt-%, preferably less than 15 wt-%.

from Al and Ge is less than 50 wt-%, preferably less than 20 wt-%.

from B is less than 20 wt-%, preferably less than 8 wt-%.

Infiltration of liquid silicon alloys into the intermediate body is performed by the most suitable methods, for example, by melting of the corresponding alloy directly on the surface of intermediate body, or, for example, by dipping of intermediate body in the corresponding melt or, for example, by pouring of the corresponding melt on surface of intermediate body. When using alloys it ensures simple infiltration process connected with the lower melting temperature of alloys compared with individual substances, better wetting of the intermediate body surface and more intensive penetration into pores of the intermediate body. As a result of infiltration a practically non-porous material comprising diamond, silicon carbide and additional phases, content of which is determined by the type of the used metals in the alloy, is produced. Such additional phases can be metal suicides (for example $NiSi_2$) and/or metal carbides (for example TiC and NbC) and /or alloys of metals (for example Ag) with silicon, or any combination thereof.

Content of the metals (besides silicon) in the final dense diamond composite is less than approximately 30 wt-%, preferably less than 20 wt-%. For some metals the content is naturally limited by the composition of the used silicon alloy employed and the maximum porosity of the initial work-piece. Thus, for metals from the group of V, Nb, or Ta their content in material is less than 10 wt-%, preferable less than 5 wt-%. For metals from the group of Mo and W their content in material is less than 5 wt-%. Finally, for the metals Fe, Co, and Ni the material content should preferably be less than 10 wt-%.

During the infiltration of pure silicon, the chemical reaction of non-diamond carbon and silicon takes place resulting in the formation of silicon carbide, which together with eventual free silicon forms the matrix of the produced body or material. If a silicon alloy is used instead, the chemical reaction of non-diamond carbon and silicon takes place resulting in the formation of silicon carbide, and the final body comprises also other phases of metal-silicon-carbon or boron-silicon-carbon. These metal-silicon-carbon or boron-silicon-carbon phases comprises silicon carbide, metal carbides, boron carbides, metal silicides, boron silicides, metal carbosilicides, alloys of metals with silicon and silicon. These phases form the matrix of the produced body.

A final body is the product of eventual additional treatment, mechanical or other, of the infiltrated body.

Of particular importance is the formation of carbon in the body. Non-diamond carbon in the body may thus be achieved by the following different ways:

1. Graphitization by heat treatment of the diamond particles in the work-piece to transform the surface layer of diamond to graphite.
2. If a strengthened body for machining purposes is needed, deposition of pyrolytic carbon into the body is useful. The pyrocarbon part of the total carbon needed is determined by the required strength for the machining operation.
3. During the heat treatment for the silicon or silicon alloy infiltration additional graphitization is made.
4. Eventual residual pyrolytic carbon from binders.

Thus, the determination of contributions to the total amount of non-diamond carbon is made by:

a) establishing the possible need for pyrocarbon.
b) establishing the degree of graphitization during the heat treatment for the silicon or silicon alloy infiltration.
c) establishing the amount of any residual pyrolytic carbon from binders.
d) primary graphitization makes up the additional carbon amount needed.

Note that when no pyrocarbon is needed, process steps 1 and 3 are merged.

Thus one feature of this invention is the ability to govern and vary the degree of diamond graphitization by simultaneous control of process and material parameters such as shape of the time-temperature curve, i.e. temperatures, holding times and heating rates, size, type and quality of and impurities in the diamond particles, the atmosphere and the pressure. Control considerations include e.g.:

The relative volume of silicon, alloying element and eventual silicides or alternatively residual pores, silicon carbide, any other carbides of the alloying elements used, and diamond in the final body depend upon the degree of graphitization which consequently has to be executed with precise control.

For submicron and small diamond particles it is important that the graphitization does not go so far that the particles disappear. The graphitization should be less than 50 wt-% and preferably lie between 6–30 wt-%.

When mixing small diamond particles with large particles, the size of the small particles must be carefully chosen so that the small particles will not disappear, unless so desired, and the large particles will be sufficiently graphitized. The graphitization should be less than 50 wt-% and preferably lie between 6–30 wt-%.

The predominant method of governing the degree of graphitization is to choose the right shape of the temperature-time curve from about 1000° up to about 1700° C., in vacuum or in inert gas at pressure preferably up to 2 bars, as a function of diamond particle size and quality.

For different desired degrees of graphitization, suitable for materials aimed at different technological applications, different shapes for these curves have to be chosen.

By choosing the correct heat treatment, it is possible to achieve a final body with very low porosity, no graphite and a well-balanced composition between diamond, silicon carbide and silicon, or alternatively diamond, silicon carbide, other carbides of alloying elements used, and metal silicide, alloying element carbosilicides and eventual silicon. If the graphitization degree is low the final composite will contain a larger amount of silicon, eventual metal silicide, alloying element carbosilicides and/or porosity. The higher the degree of graphitization, the more silicon carbide, and other carbides the final body will contain.

Generally, an increase of the temperature and holding time increases the amount of graphite produced. The velocity of the graphitization front movement from the surface of a diamond particle into the diamond particle is determined also by the crystallographic direction and amount of material impurities and defects. When all other conditions are the same, the velocity of the graphitization front propagation will be the same for large and small diamond particles. However, the difference in particle size determines different relative graphitization degrees for large and small particles. The degree is significantly higher for small particles and is proportional to the specific area of the diamond. Thus it is important to choose optimal conditions of the heat-treatment in order to control the production of a material by the proposed method and it is of particular importance when using small diamond particles.

For small particles it is very important to accelerate the heating rate in the temperature area greater than about 1000° C., because the graphitization rate depends strongly on the temperature. Thereby the graphitization decreases (compared to slower heating to the same temperatures) and the degree of graphitization does not exceed the desired limit ($\leq 50$ wt.-%). This makes subsequent liquid silicon or silicon alloy infiltrating of the intermediate body possible. Silicon or silicon alloy infiltration throughout the body will not occur unless pores of sufficient size exist throughout the body. The process of graphitization is delicate to control and realise. It must be adjusted to the equipment and material that is used. Some of these parameters have to be empirically established to match the equipment and materials that are used.

Figure 2:
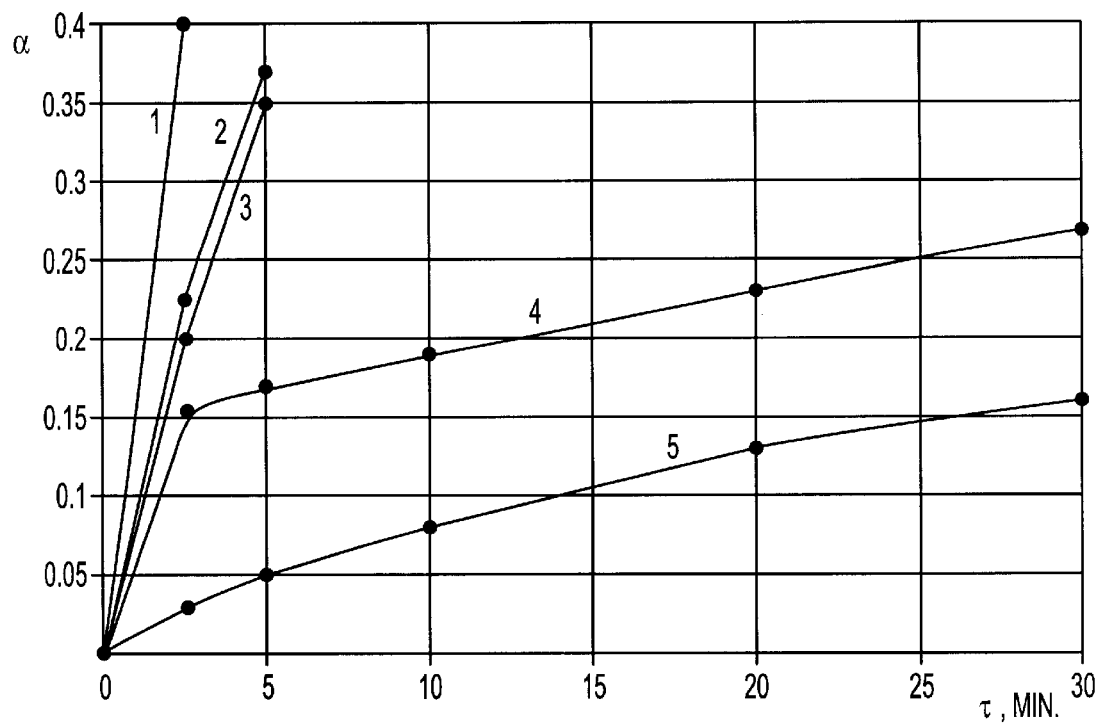
FIG. 2 shows the degree of graphitization versus the graphitization time at one specific temperature.

FIG. 2 shows the degree of graphitization, ($\alpha$) versus the graphitization time, ($\tau$), at one specific temperature for diamond particles of different size. As can be seen the relative graphitization of the particle is more rapid for smaller diamond particles (curves 1, 2 and 3 having particle sizes of 5/3, 10/7 and 14/10 $\mu$m, respectively) compared to larger particles (curves 4 and 5 having particle sizes of 28/20 and 63/50, respectively).

One of the advantages with the graphitization process of the present invention is the improvement of the diamond surface. Generally the cost of diamonds is related to the quality and size. It is well known that the surface layer of most diamond particles has defects. Defects and impurities on the surface will reduce mechanical and chemical stability. It is desired not to have surface defects and impurities while still not using expensive, high quality diamonds. This is achieved by intentionally transforming the surface layer of the diamond to graphite by heat treatment. The graphitization starts on the surface, gradually propagating deeper into the particle. Furthermore not only the diamond surface may be improved by diamond graphitization but also the bulk properties. Diffusion processes start in the diamond when it is heated. By this diffusion process metallic and other impurities are moved to the surface of diamond and embedded in the silicon carbide and silicon or alternatively silicon carbide, any other carbide of alloying element, eventual silicide, alloying element and silicon. As the graphitization transforms the defective layer on the diamond surface it will result in improvement of the total particle properties and as a consequence, of the whole composite material. To achieve these improvements the graphite layer surrounding the diamond particle should be at least 50 nm, preferably thicker than 200 nm. The graphitization should not be less than 1 wt-% and preferably be at least 6 wt-%.

Another very important achievement of the diamond graphitization is the extremely strong bond of the formed SiC, coating each individual diamond particle. The diamond will be bonded to the matrix and in a demanding application it will not be pulled out.

During the total manufacturing process leading to a dense or near dense body with no graphite, certain criteria are established:

The porosity of the materials consists of pores of different size; larger pores and smaller pores. The preformed work-pieces have a certain volume percentage of porosity and certain pore sizes before the heat treatment and the silicon infiltration, determined by the diamond particle size and size distribution, by other materials that are present or added and eventual compacting of the green bodies.

The diamond content is decreasing corresponding to the amount of graphite that is formed during the graphitization of diamonds. The total amount of non-diamond carbon in the body, including added pyrocarbon or from possible residual of binder, must be controlled in order to achieve a final body with an optimum content of silicon carbide (produced in the reaction between the non-diamond carbon and the silicon) relative to elemental silicon, the elemental silicon filling up the porosity creating a dense or near dense body—if pure silicon is used for infiltration. If a silicon alloy is used instead, the same as above applies but the products can comprise also other carbides of the alloying element, suicides of the alloying elements and eventually other carbosilicides.

The initial porosity and degree of graphitization influence the properties of the final body. At a work-piece porosity of greater than 60 vol.-%, the strength of the work-piece is insufficient for realisation of the subsequent steps of the process. When the porosity of a work-piece is less than 25 vol.-%, it is difficult to infiltrate silicon or silicon alloy into the intermediate body, and the final body will have significant residual porosity. The same problems appear if the graphitization degree is more than 50 wt-% or if the amount of deposited pyrocarbon and residual carbon from binders is more than 25 wt-%, because the limiting small pores will not be sufficiently large (due to too thick carbon layers). In such cases during silicon or alternatively silicon alloy infiltration, a dense layer of silicon carbide, or alternatively silicon carbide and other carbides or silicides of alloying element, is formed in the surface zone of the intermediate body, which blocks the penetration of liquid silicon or silicon alloy into internal parts of said intermediate body.

Figure 3A:
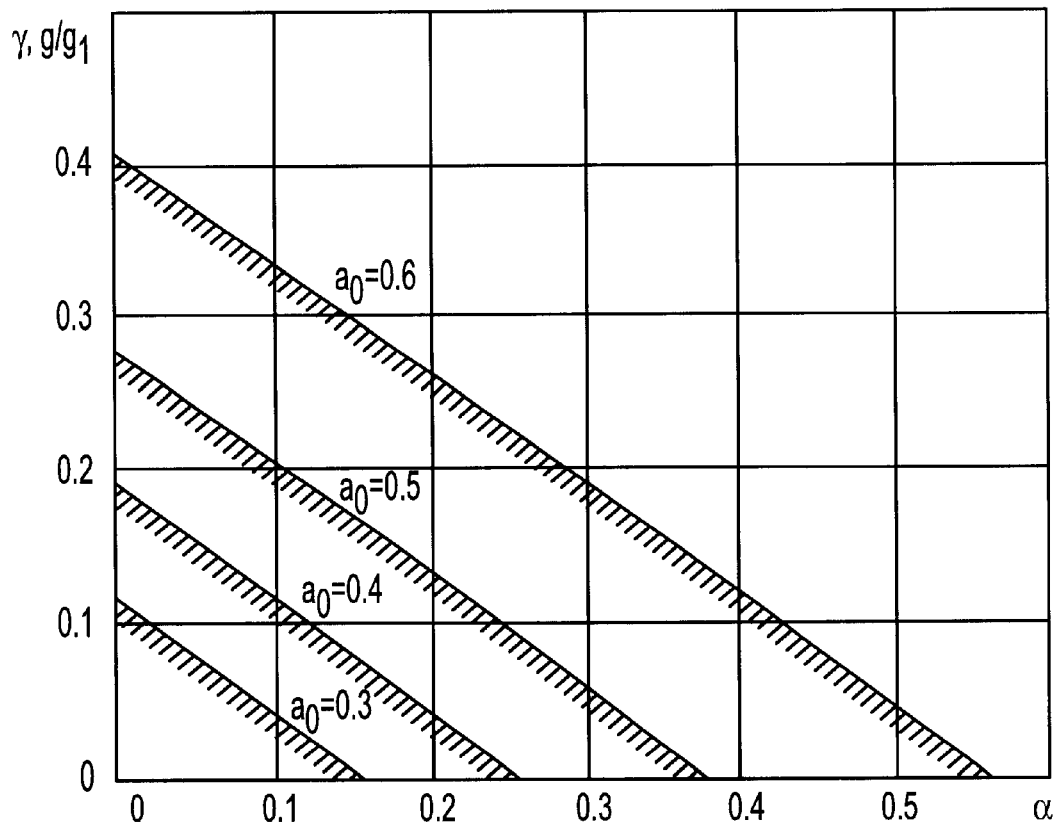
FIG. 3a shows the relationship between the amount of carbon (α and γ) inserted into the body at different initial porosity $\epsilon_0$ that meet the conditions of $\phi_D+\phi_{SiC}<1$, in the final body.

For a given initial porosity of the work-piece ($\epsilon_0$), the maximum amount of carbon, prepared by graphitization, deposition of pyrocarbon and any possible residual pyrolytic carbon from binders, that at a later processing step will allow reaction between all of the carbon with infiltrated silicon to form silicon carbide, is illustrated in FIG. 3a. The relative amounts of graphite ($\alpha$) and pyrocarbon plus residual carbon from binders ($\gamma$) for any acceptable combination hereof are also distinguishable from this figure. The process is limited by the total amount of carbon related to the porosity. At a certain initial porosity, the final composite will contain a large amount of silicon if the amount of carbon is too small. If the amount of carbon is too large, certain amounts of residual carbon will be left in the final composite, which is unwanted because the carbon acts like defects in the material. See also the two graphs, FIG. 3b and FIG. 3c that show the relationship between the graphitization degree for a certain initial porosity and the composition of the final composite. As can be seen the variation of the components diamond, silicon carbide and silicon is linear. As the graphitization degree increases, the carbon content increases while the diamond and silicon contents decrease.

These figures have been produced by using these following equations under the conditions that the total body volume does not change and that there are no pores in the produced body:

The volume content of diamond in the final material is:

$$\phi_D = (1-\epsilon_0)(1-\alpha) \qquad [eq.1]$$

where $\alpha$ is the graphitization degree, i.e. amount of graphite, $\epsilon_0$ is the initial porosity of the work-piece.

The volume content of silicon carbide in the final material is determined by the amount of carbon that has reacted with silicon:

$$\phi_{SiC} = (1-\epsilon_0)(\gamma+\alpha)\rho_D M_{SiC}/(\rho_{SiC} M_C) \qquad [eq. 2]$$

where $\rho_D$ and $\rho_{SiC}$ are the densities of diamond and silicon carbide respectively; $M_{sic}$ and $M_C$ are the molecular masses of silicon carbide and carbon, respectively.

The volume content of silicon in the final material is:

$$\phi_{Si} = 1 - (\phi_{SiC} + \phi_D) \qquad [eq. 3]$$

To perform the production of non-porous material it is necessary to meet the condition of $\phi_D + \phi_{SiC} < 1$. This condition is fulfilled by the values of $\alpha$ and $\gamma$ falling into the areas shown in FIG. 3a. Therefore the amount of pyrocarbon and binder residues that may be inserted to meet the condition of $\phi_D + \phi_{SiC} < 1$ in the final material depends to a large extent on the graphitization degree.

Figure 3C:
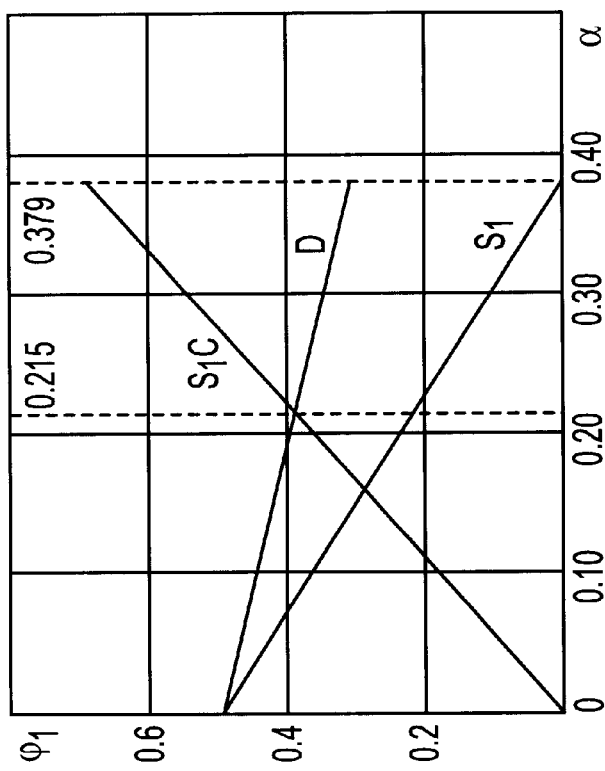
FIGS. 3b and 3c show the relationship between the final body composition and diamond graphitization degree in the body, with initial work piece porosity $\epsilon_0=0.3$ and $\epsilon_0=0.5$, respectively, when pure silicon is used for infiltration.
Figure 3B:
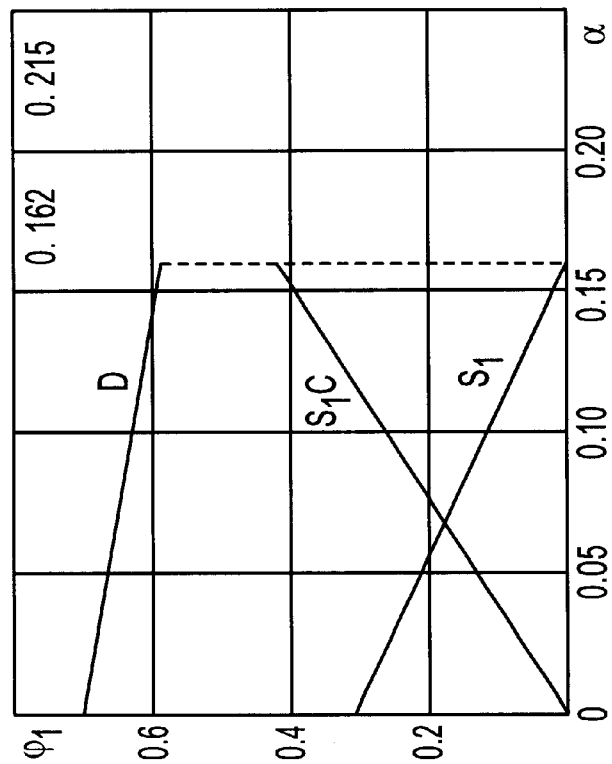

The solutions of equations 1, 2 and 3 at $\gamma=0$ give the relationship between the diamond composite composition and initial porosity of the work-piece according to FIGS. 3b–3c.

Similar calculations may be done for the case when silicon alloys are used.

Figure 4A:
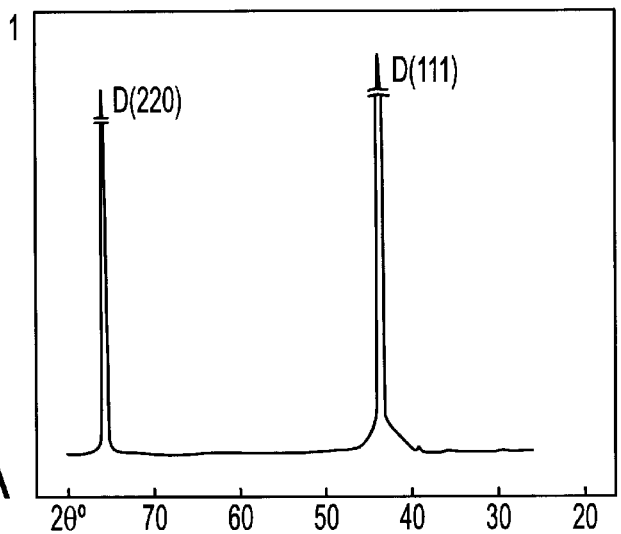
FIGS. 4a to 4c show the results of X-ray diffraction analysis of a work piece, an intermediate body and the final body, produced by infiltration of intermediate body by silicon, respectively.
Figure 4B:
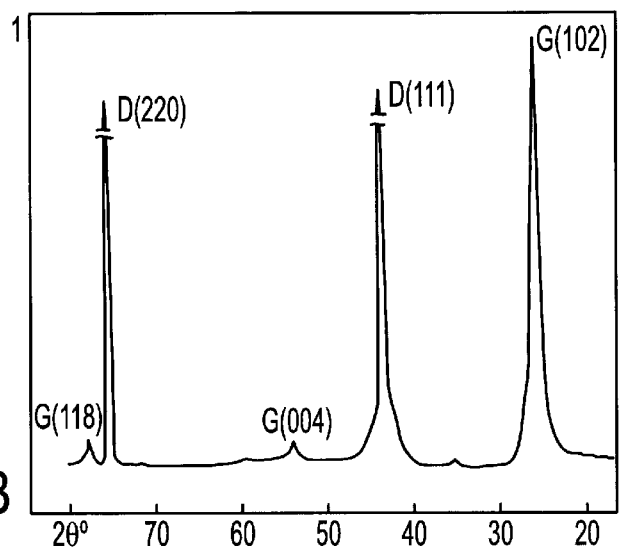
Figure 4C:
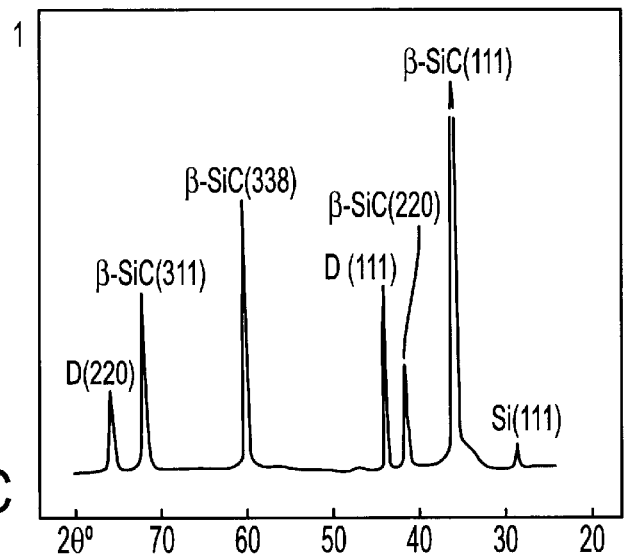

FIGS. 4a–4c show the results of phase X-ray diffraction analysis of samples made according to this process. It is shown from FIG. 4a that the initial work-piece formed of diamond powder contains a diamond phase (marked with <<D>>). Subsequent heat treatment of the work-piece to obtain an intermediate body results in formation of a graphite phase in it, as can be seen in FIG. 4b (marked with <<G>>). In the subsequent silicon infiltration of the intermediate body, the silicon reacts with graphite and produces silicon carbide. FIG. 4c shows that the graphite is absent in the final product and that diamond, silicon carbide (marked with <<SiC>>) and silicon (marked with <<Si>>) is present.

USE OF PARAMETER VARIATIONS OF DIFFERENT KIND

Parameter variations may be applied to the material during various processing steps to control both the final properties of the product and the manufacturing cost. The variation may be a successive change of a parameter, i.e. a gradient. Different combinations of gradients and/or parameter variations may be applied to the entire body or parts of the body. The applied parameters are:

- diamond particle size;
- diamond quality;
- diamond bonding;
- diamond type;
- porosity and pore sizes;
- amount of silicon carbide and silicon; and
- amount of metal-silicon-carbon or boron-silicon-carbon phases and silicon.

Several of these parameters are dependent on each other. In the following examples set forth below, of controlling the final properties by the use of gradients and combinations thereof, will be shown.

Variation of the Diamond Particle Size—Combination of Diamonds of Different Sizes The material according to the present invention may include not only one but several sizes of diamond particles. The use of diamonds of several sizes in the material gives it special characteristics. Large diamond particles provide the material with good abrasive properties (hereby referred to as abrasive, wearing, cutting and other mechanical material removing properties). However, in the case of pure silicon infiltrated products, lower relative wear resistance of the SiC/Si matrix may lead to debonding, loss of these large diamonds from the matrix, especially under severe operational conditions thereby decreasing the lifetime of a composite tool. By combining large diamond particles with small in a homogeneous mixture, the lifetime of the tools will increase due to an increased wear resistance of the formed new matrix. Small diamond particles reinforce the composite. Being distributed throughout the whole matrix, small diamond particles increase the Young's modulus, the thermal conductivity, the hardness, the wear resistance etc. For instance, when about 40 vol.-% of diamond particles with a size of about 10 $\mu$m are included in the SiC-Si matrix, the Young's modulus will increase from 400 to 650 GPa and the thermal conductivity will increase from 80 to 250 W/mK, if compared to a SiC—Si matrix without diamonds. So, the use of small diamonds together with large gives not only enhanced material properties but also is more economical than only to use large diamond particles.

The same as described above applies for silicon alloy based materials.

Variation of the Diamond Particle Size—Gradient of Diamond Sizes

Generally the drawback of producing materials with different diamond size or concentration in different parts of the body and that has been compacted together before silicon infiltration, is that there may be differences in physical/mechanical properties in the layers. These differences might cause unwanted stress situations at the interface and thereby weaken the composite.

By the method of the present invention it is possible to produce a material with prior specified distribution of diamond particles of successively changing size throughout the body volume, a size gradient material, with uniformly changing properties that will overcome or strongly decrease these above mentioned drawbacks.

A practical way of producing a composite with a gradient arrangement is, for instance, to form a body with three different parts in a mould. In the first part a mixture of particles with sizes A, B and C is used. The second part consists of particles with sizes A, C and D. The third part consist in turn of particles with sizes A, D and E. Diamond particles of size A are smallest. To have small diamonds (size A) throughout the body increases the strength of the matrix, i.e. material between the larger diamond particles. After being placed in the mould, these individual parts are vibrated, and then finally pressed together. The parts are then bonded by the graphitization, pyrocarbonization and during the silicon or silicon alloy infiltration. The smooth transition in particle size between the parts through the body volume will form a size gradient material and the small diamonds of size A will strengthen the matrix.

Advantages with a gradient arrangement is the possibility to enhance certain properties depending on the diamond particle size in desired parts in the material, for instance to increase the wear resistance in areas being exposed to wear. One practical example is when used as sealings and bearings. In addition the use of small diamonds is more economical than only to use large.

Variations of the Diamond Quality

Diamonds of high quality are generally more expensive than diamonds of lower quality. The term quality is understood as something that varies with the following parameters; mechanical and optical properties, if it is well crystallised or not, defects like inclusions and cracks (mostly in the surface), shape, if they are synthetic or natural etc.

The material according to this invention may be produced by using cheaper diamonds of lower quality in those parts of the composite, which at application need less performance. Good quality diamonds are used to enhance the properties and the performance in critical areas. By this way it is possible to lower the total cost of diamonds. Additionally graphitization will improve the surface of diamonds of lower surface quality.

Variations of the Diamond Type and the Bonding of Large Diamonds

The material according to the present invention can be used for various fields of application, from tools for grinding, turning, milling, for instance, to applications where the material that is in contact with the composite is not aimed to be affected.

The present invention allows adjustment of the material to different fields of application by optimising the performance of the composite for each field. Due to its superior hardness, diamond is the component in the composite that is used for the main part of the work effort, therefore this adjustment may be done by altering the diamond parameters; type, particle size and concentration.

There are several types of diamond particles; from well crystallized blocky single crystals with sharp cutting edges to types consisting of different diamond layers on top of each other, e.g. onion-shaped, where each layer has cutting edges. The latter type is sometimes referred to as friable. These two types have significantly different properties and between these extremes there are a large variety of diamond types.

In other materials, for instance when used for grinding wheels, it is known that the chosen diamond type has a great influence on the properties of the grinding wheel. To adjust the properties in a proper way it is however necessary to adjust the bonding force of the diamonds to the diamond type used.

In known grinding wheel materials it is difficult to achieve such detailed adjustment of the bond needed for optimal performance. Principally three different types of bonds are used for grinding wheels; resin bond, metal bond and vitreous bond.

By the method according to the invention there are good possibilities to make an adjustment of bond of larger diamonds (>20 $\mu$m) and properties of the bonding matrix (here comprising also small diamonds). A suitable hardness of the matrix can be chosen by varying the concentration of small diamonds of size <20 $\mu$m, preferably <10 $\mu$m (10–50 vol.-%); silicon carbide (20–99 vol.-%) and other metal-silicon-carbon or boron-silicon-carbon phases (1–30 vol.-%) and thereby also the wear resistance of the matrix and the subsequent bond of the larger diamond particles.

It is possible to choose the hardness of the matrix within a range of about 20–63 GPa by varying the composition of the matrix; hardness of diamond is about 100 GPa, of silicon carbide about 25 GPa, of the metal carbides formed by the infiltration of silicon alloys about 15–25 GPa and of silicon and silicon alloys much less than 10 GPa. By this kind of adjustment the performance of our improved material is optimized for various applications.

A matrix hardness of 20–30 GPa is preferable for diamond types requiring a relatively weak bond; 50–63 GPa for diamond types that need a strong bond; and a hardness of 30–50 GPa for diamond types or mixtures requiring intermediate bonding strength.

Variations of Porosity and Pore Sizes in the Work-piece—Gradient of Porosity and Pore Sizes By the present method it is possible to produce an intermediate body with different amount of porosity and various pore sizes throughout the body. By this method it is possible to produce a work-piece with total porosity ranging from 25% to 60% and with pore sizes ranging with the size of the diamond particles.

The pore structure determines the extent to which it is possible to infiltrate silicon or silicon alloy so that all of the non-diamond carbon in the intermediate body is reacted with the silicon or silicon alloy. Too small pore sizes and also too little porosity, unsuitable distribution of pore channels, improper infiltration and too poor wetting, too high viscosity of the silicon or silicon alloy etc. may lead to blocking of infiltration because produced silicon carbide and any other carbide of the alloying elements prevent molten silicon or silicon alloy to penetrate the material further, throughout the whole body. Especially narrow pores are critical because they can easily be clogged, which will block and interrupt further infiltration.

This prevention of the infiltration has earlier been one of the limitations for producing thick and large infiltrated bodies useful for such purposes as engineering details, structural components, load carrying devices such as bearings etc.

By distributing diamond particles of successively decreasing sizes from the surface of the green body towards the centre, a body with a pore size gradient is made. Pores of increasing sizes from the centre of the body towards the surface will facilitate the infiltration by allowing silicon or silicon alloy to penetrate the inner parts of the body by minimising the risk of blocking the infiltration near the surface zone. This build-up of the porosity makes possible to produce larger bodies than before. In addition in the present method a controlled amount of carbon is placed tightly to the diamond particles and is not placed between the diamonds, which is advantageous when creating a suitable pore structure.

In practise the pore size gradient is easily achieved with the diamond size gradient and also by variation of the packing density of the diamonds in the green body, the diamond loading.

Variation of the Amounts and Gradient Structure of Silicon Carbide and/or Silicon The silicon carbide and silicon matrix is tightly bonded to the diamond particles providing excellent properties of the material according to the present invention. Furthermore the silicon carbide content is important for the properties of the material, affecting for instance the hardness and the bonding of diamonds. The amount of silicon will also affect the properties of the material, for example increased silicon content will lower the hardness and wear resistance. Other properties that are affected by the composition include thermal conductivity which increases with the diamond content, and electrical conductivity which increases with the silicon content etc.

Therefore a well-balanced composition between the diamond, silicon carbide and silicon is desired. This balance in composition depends on the intended specific application for the composite or material. By varying the composition it is possible to control the properties and thereby adjust them for the specific application. The way to vary the content of silicon and silicon carbide in the final body is to alter the amount of non-diamond carbon in relation to available porosity. This is done for example by altering the conditions of the heat treatment giving different amount of graphite formed and pyrocarbon added, by different amounts of non-diamond carbon left from binder residues, and by diamond size/pore size variations, and the like. (A gradient of size will give a gradient of silicon carbide and silicon).

When used as engineering materials fully dense bodies are preferred. However in certain applications like grinding wheels a porous final body is sometimes preferred. The remaining porosity must be controlled, which is very difficult, if at all possible, by infiltrating the intermediate body by liquid silicon/silicon alloy. One reason is that it is difficult to add an exact amount of silicon that is necessary for the process, especially for small objects. This leads to lack of control of the homogeneity of the infiltrated body. Too little silicon/silicon alloy would result in excess carbon in the material. The other reason is the lack of control of the location where the possible excess silicon is deposited.

The remaining porosity in the final body is more easily controlled by the present method by using the technique with pre-infiltration of silicon/silicon alloy i.e. by exposing the intermediate body to silicon/silicon alloy vapour or using Si-deposition by a CVD technique. In such process the amount of silicon/silicon alloy added to the intermediate body can be controlled by a combination of the amount of vaporized silicon/silicon alloy, the temperature and the pressure and time of the process.

Thus adding silicon vapours is another way to affect the silicon carbide and silicon content in the final material, independently from the other parameter variations.

Variation of the Amounts and Gradient Structure of Metal-silicon-carbon or Boron-silicon-carbon Phases and Silicon When using silicon alloys for the infiltration of intermediate bodies, as well as when using pure silicon, a silicon carbide matrix is formed, which tightly bonds diamond particles. The alloying element present in the alloy, i.e. metals or boron, provides the formation of new phases along with silicon or instead of it. Thus, such phases can be metal or boron carbides, metal or boron silicides, metal carbosilicides, eutectic alloys of metals or metal silicides with silicon. When the alloying elements react with carbon formed during graphitization, carbides are formed. Silicides are formed as a result of interaction of the melt components.

The specific alloying element(s) used in the silicon melt determines the types of phases that are formed. Some elements form carbides, others silicides. Some elements form eutectic alloys with silicon. By controlling the content of elements in the alloy it is possible to increase or decrease the content of carbides, suicides and eutectic alloys composition in the final material. The hardness of the formed substances is known to increase according to the following: eutectic alloys<silicides<carbides. Thus, by changing the silicon alloy composition, it is possible to affect the matrix hardness of the produced composite material and its wear resistance. The use of silicon alloys comprising metals or boron, results in formation of a greater amount of additional phases. The presence of these additional phases may often give a fine grain structure. This greater number of interfaces is useful for the increase of mechanical properties of the material.

It is well known that the fracture toughness might increase in such a case. By careful control of the amount and the combination of alloying elements, favorable combinations of hardness and toughness can be achieved depending on aimed application.

A gradient of diamond particle size/pore size will result in a gradient of metal-silicon-carbon or boron-silicon-carbon phases in the final body.

PREFORMING AND NEAR NET-SHAPE TECHNIQUE COMBINED WITH STRENGTHENING OF THE INTERMEDIATE BODY

By this method of the present invention it is possible to produce bodies of various predetermined sizes and shapes. The bodies produced may be large and have complicated shapes, which will be illustrated in this section.

In prior art methods the forming of green bodies of carbon-coated or non-coated diamonds mixed with carbonaceous materials, is done in a temporary mould or in the same mould as the evaporation/decomposition of binders and silicon infiltration is carried out. A relatively large quantity of binders might be required for this forming, especially when using large diamond particles. The productive efficiency is decreased by requiring a mould for each green body when placed in a furnace. The consumption of moulds is high; the lifetime of the mould is decreased due to the high wear in the heat treatment processes. There might also be problems with the releasing of the composites from the moulds, e.g. graphite moulds are commonly used and during the liquid silicon infiltration step some silicon may react with the graphite and thereby cause problems when releasing the body from the mould.

The preforming technique of the present invention is not restricted to using moulds, to the ability of producing moulds of complicated shapes, or to the ability to release and take out an infiltrated body from the mould as is the case for some prior art methods. The forming of the green bodies according to the present invention is made by known techniques such as pressing in moulds, tape and slip casting, injection moulding etc. However, with the method of the present invention it is possible, but not necessary, to use a mould during the forming step, heat treatment step or infiltration step. Preferably the heat-treatment and infiltration steps are done without using a mould. Still, for large batch production of complicated shapes it might be advantageous to use molds during the whole process.

During graphitization the diamond is transformed to graphite of lower density therefore requiring more volume. However, the process according to the present invention is characterized by constant shape and size throughout all the process steps from the forming of the green body/work-piece through the subsequent steps into a final product (except intentional machining of the intermediate body). The conclusion should be that the graphitization of the diamond particles affects the pores, i.e. the porosity changes in the intermediate body. Thus the method ensures size and shape congruity through the whole process. This near net-shaping technique provides for a waste-free production and makes possible to produce a final body of predetermined size and shape, thus the final body requires no machining except eventual finishing operations.

Figure 5:
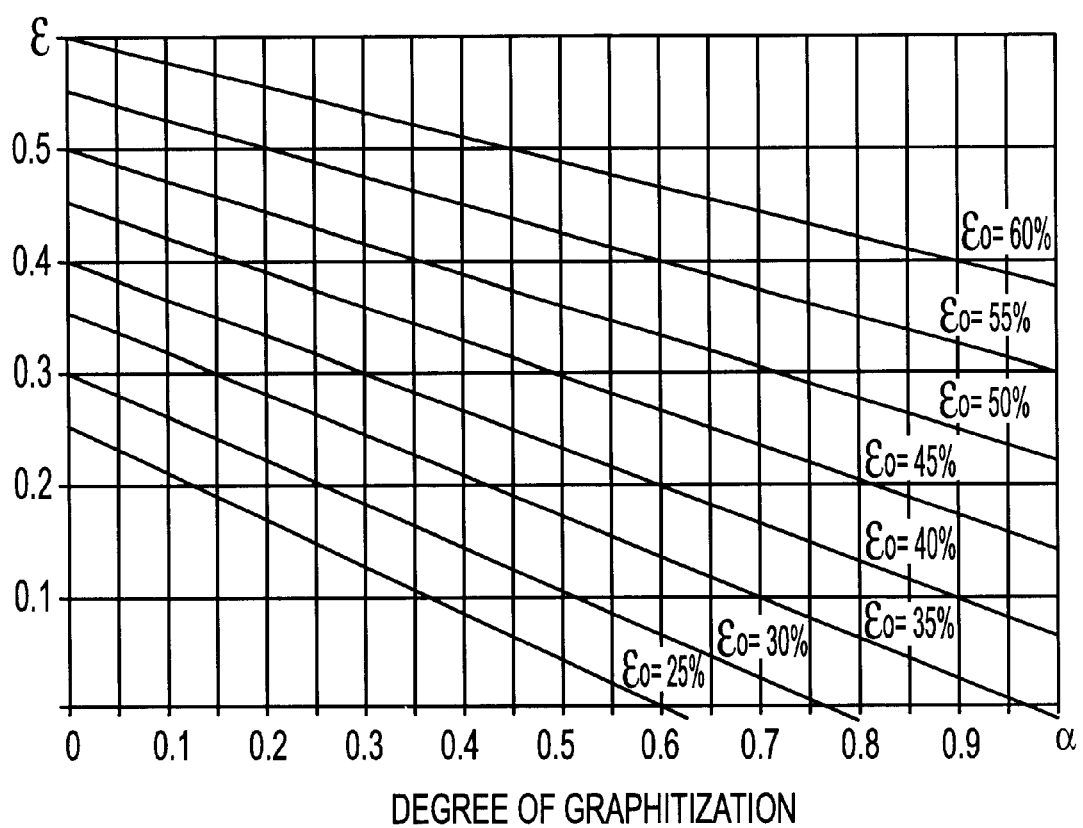
FIG. 5 shows the change of work piece porosity during graphitization at different initial work piece porosity.

FIG. 5 illustrates a linear change of the intermediate body porosity, $\epsilon$, during graphitization versus the degree of graphitization, a, at different initial work-piece porosity.

Unless it is desirable to machine or execute additional shaping of the intermediate body i.e. if there are no special requirements on the shape, it is preferred to let the carbon be derived from the graphitization process.

The near net-shaping technique of our method is applicable to a great extent. Should however, machinability of the intermediate body be desirable in addition to the near net-shape technology, e.g. if the final body requires very complicated forms, pyrocarbon depositing or pre-infiltration of silicon into the body is advantageous. The deposition leaves a firm body and gives the intermediate body excellent strength even without using any binders, which is not the case with an intermediate body comprised of diamond particles with only graphitized surfaces.

This makes possible to machine the intermediate body with relatively advanced methods, e.g. milling, turning and drilling, without breaking it. This enables the formation of much more complex shapes compared with those that are obtained just by forming of the green body/work-piece. Furthermore, this represents considerable cost savings also because machining of the final product is time consuming and difficult due to the high hardness and wear resistance.

In order to choose the best relation between the amount of carbon derived from the graphitization and pyrocarbon process an analysis of the required additional machining and of desired properties must be done. About 5–6 hours of heat treatment at about 850 C is required to deposit pyrocarbon into a green body with diamonds sizes of 20/28 $\mu$m in an amount of 5 wt.-% of the total mass, at low pressure, while it only requires 3 minutes at 1550 C to transform about 15 wt-% of the diamond to graphite.

By this inventive method of using diamond graphitization or combining diamond graphitization with pyrocarbon deposition or pre-infiltration of silicon, or the use of binder, it is possible to produce bodies of large sizes and of very complicated forms.

Hollow bodies and bodies with holes and cavities may be produced by joining work-piece elements, before heat treatment and silicon infiltration. For instance, a hollow sphere may be produced by joining two hollow hemispheres, a hollow hexagon by joining six plates etc. This technique is very advantageous because it saves expensive diamond material and weight in the final body, and it enables one to produce hollow components suitable for different engineering purposes, while at the same time being spared from additional expensive and tedious machining of the final material. It is also possible to produce bodies with a cavity that fits to the shape and size of a shaft of a non-circular cross section. This shaft is then fitted into the final composite body, eventually together with an adhesive to adhere the shaft to the composite. Thick and large bodies may also be produced by using pore size gradients facilitating the infiltration of the silicon or silicon alloy, as described above.

Furthermore when producing a composite body, pyrocarbon deposition may be used in preparation for machining to such shapes that would not have been possible with mould pressing, without breaking the mould or e.g. using a mould that can be divided.

It is obvious that there is a possibility to produce large bodies by stacking several intermediate bodies upon each other with a silicon layer or a silicon alloy layer in between. This might lead to inhomogeneous mixtures, inhomogeneous infiltration, shrinkage of the body and problems of shape stability. Therefore the method of the present invention is the preferred.

It is also possible to combine intentional graphitization and addition of carbonaceous materials from the beginning, for instance by adding a larger amount of binder from the beginning, but the method according to the present invention is the preferred. Tests with mixing diamonds together with carbonaceous materials like carbon black and carbon fibres, and binders like paraffin and epoxy resins, were made. The results from these tests showed that the work-pieces and the samples after silicon infiltration had cracks and breaches and also showed changes in shape.

ADVANTAGES WITH THE PROCESS AND MATERIAL ACCORDING TO THE PRESENT INVENTION

One of the great advantages of the present invention is that the process parameters can be varied to accomplish the desired diamond graphitization in the work-piece to provide optimal conditions for the production of a polycrystalline body of predetermined desired shapes and sizes, having desired strength, physical and mechanical properties. In comparison with methods where carbon-coated or non-coated diamonds are mixed with carbonaceous materials for production of diamond composites, the method of the present invention using graphitization and when required, pyrocarbon deposition or pre-infiltration of silicon/silicon alloy, has several advantages, including:

During diamond graphitization the graphite is formed directly on the surface of all diamond particles and during the optional deposition of pyrocarbon directly on graphitized diamonds. Therefore carbon is tightly in contact with the surface. Thus, the critical small pores between particles remain free for subsequent silicon or silicon alloy infiltration of the intermediate body. Smaller particles of carbon black, carbon fibres and the like, are placed between the diamonds when using known techniques of mixing carbonaceous materials with diamond particles. These smaller particles may agglomerate in the narrowed pores, thus making the pore sizes even smaller, which may affect the infiltration negatively.

The distribution of carbon is important for the properties of the final material. The carbon layer is in tight contact with the diamond surface by the diamond transformation into graphite and by optional deposition of pyrocarbon onto the body. This tight contact guarantees the formation of silicon carbide, and any other carbides of alloying elements directly on the surface of the diamond particles thus forming a diamond-matrix interface of high adhesion i.e. the diamonds are tightly bonded to the matrix. The properties are improved due to the high adhesion of both small and large diamonds. The diamonds will not chip out from the matrix so easily while used in different applications. The material is extremely wear resistant. When using in operations requiring very strong bonding, the large diamond particles will be used totally in the process and if the right type of diamond is used, while in traditional abrasive materials (with metallic or organic bonds) the diamonds are only used to about 50 vol.-% before falling out from the matrix.

Heat treatment of the eventual binder and graphitization can be accomplished using the same equipment as for silicon or silicon alloy infiltration (when pyrocarbon deposition is not used). Thus these process steps can be realised step by step in the same furnace resulting in decreased overall time for producing the final material.

The graphitization of diamond starts on the surface of the diamond particles, gradually propagating deeper into the particle. The graphitization transforms the defective layer on the diamond surface, resulting in improvement of the particle properties and as a consequence, of the whole composite material for instance regarding the thermal stability. This allows the use of relatively low cost diamonds.

In the present invention, graphitization of diamond with or without deposited pyrocarbon avoids the various problems associated with physically mixing in carbonaceous materials as the source of carbon. These problems include non-uniform distribution of carbon, incomplete reaction with silicon, blocking of pores and inhomogeneities due to different size, shape and density of the mixed materials.

The graphitization will provide for fast and proper carbon formation in the whole body volume, starting from the surface of the diamond, expanding linearly. Only a relatively small amount of diamond is transformed. Thus when producing very thick and large bodies, the graphitization is advantageous due to the ability to form carbon even in deeper parts of the body without risk of blocking the pores for the subsequent infiltration.

In the present method the initial green body contains only one solid material, diamonds. This is advantageous when using up-to-date forming methods such as slip casting or slurry casting. These forming methods provide for production of articles with complex shapes. When using mixtures where the particles have great difference in densities and size, and if fibres are used, these forming methods may be more complicated.

The process can give various different complicated shapes due to near net-shape techniques and the ability to machine the intermediate body with advanced methods. Pyrocarbon deposition or pre-infiltration of silicon or silicon alloy will provide for sufficient strength for machining complicated shapes. The shape and size of the final body is not restricted to moulding techniques. This leads to cost advantages by not being restricted to forming techniques by the use of moulds and by avoiding the expensive use of moulds during the heat treatment and silicon infiltration steps. Further, there will not be problems with releasing bodies from the mould.

The process according to the present invention gives significant cost advantages due to the fact that a great number of bodies may be produced in one batch and the main method to produce carbon, graphitization of diamond is a faster method than pyrocarbon and uses no gas, low pressures are used. Due to the machinability of strong intermediate bodies, tedious and expensive machining of the final body may be avoided. If no additional machining is needed, the process is a one step process where the graphitization of diamond is performed during the temperature raise before the silicon or silicon alloy infiltration. There is no need of using moulds otherwise than for, in some cases forming. Due to the near net-shaping, no or very little finishing and machining of the final product is needed, which reduces the costs further. Diamonds with a relatively lower price may be used.

The Material According to the Present Invention Holds Several Advantages:

The versatility of the process is unique. The process parameters can be varied to give the material desired properties. With this method it is possible to produce not only materials of good wear resistance and with improved performance for abrasive, grinding and other mechanical removing operations but also for structural and engineering purposes, load bearing materials etc.

One feature of the invention is that the proposed material is characterised by allowing the combination of different excellent properties simultaneously and matching such properties that correspond best to the various intended applications. Controllable properties are, for instance:

1. A high Young's modulus and sufficient strength in combination with low density.
2. High hardness and high bonding strength of the diamonds that result in excellent abrasion and erosion wear resistance.
3. A high thermal conductivity and low thermal expansion coefficient, depending on the diamond content.
4. Maintenance of mechanical properties after exposure to temperatures up to 1500°–1600° C. in vacuum.
5. A ceramic composite with high thermal-shock resistance.
6. Electrical conductivity.

When mixing together small and large diamond particles, two facts affect the material properties; the high adhesion between the diamond particles and the matrix, and the high wear resistance of the matrix due to small diamonds distributed therein. Large diamond particles will drop out from the material if the bond to the matrix is insufficient or the matrix has low wear resistance. Small diamond particles reinforce the matrix, giving it high wear resistance and increased rigidity, strength, and thermal conductivity. All this improves significantly the abrasive properties (wearing, cutting and other mechanical material removing properties) of the materials: increased thermal conductivity decreases the temperature in the working area of diamond particles. Increased rigidity of final bodies will prolong the lifetime of the tool when used for high precision machining.

EXPERIMENTAL

EXAMPLES OF METHOD REALISATION AND MATERIAL PROPERTIES

The following different diamond types were used for preparation of samples, which were tested: ACM 5/3 synthetic diamond particles (size range 3–5 $\mu$m), ACM 10/7 synthetic diamond particles (size range 7–10 $\mu$m), ACM 14/10 synthetic diamond particles (size range 10–14 $\mu$m), ACM 28/20 synthetic diamond particles (size range 20–28 $\mu$m), ACM 63/50 synthetic diamond particles (size range 50–63 $\mu$m), and A-800/630 natural diamond particles (size range 630 800 $\mu$m,) all from Superhard Materials Institute, Kiev, Ukraine.

Example 1

Control of Properties

To demonstrate our ability to manufacture materials with different properties of key importance we have chosen variation in a) E-modulus and b) Electrical resistivity. The method of the present invention achieves the result by controllably selecting the following process steps:

1. A mixture is formed of diamond micro-powder of the type ACM 28/20 and a binder—25% alcohol solution of phenol formaldehyde resin—in an amount of 2 wt-% dry resin of the mass of diamond powder. The mixture is stirred thoroughly and sieved through a screen with mesh size of 200 $\mu$m.

2. Forming of bars of length 50 mm with rectangular cross section area 6×5 mm is are made by pressing using metallic moulds, with a force of 45 kN at room temperature.

3. The green bodies are removed from the mould, kept at room temperature in air for 10 hours, subsequently dried at 70° C. for 1 hour and hardened at 150° C. for 1 hour. The produced work-pieces contain 98 wt-% of diamond (56 vol.-%) and has a porosity of 41 vol-%.

4. Heat treatment of the samples is done in vacuum (pressure 0.1 mmHg) at 1550° C. Sample no. 1 was heated 3 minutes, sample no. 2 was heated 10 minutes, sample no. 3 for 20 minutes and sample no. 4 was heated 30 minutes.

5. Infiltration is done by melted silicon on the surfaces of the intermediate bodies at 1550° C.

As a result polycrystalline bars are produced of the length 50 mm with rectangular cross section area 6×5 mm, i.e. the size and shape is not changed within the accuracy of the measuring technique (±0.001 mm). The bodies contain diamond particles bonded by a matrix of silicon carbide and silicon.

Additionally samples 5–7 were formed (5×6×50 mm) of diamond powders using a temporary binder. Sample no 5 is produced from diamond powder ACM 10/7, sample 6 from a mixture of diamond powders ACM 63/50 and ACM 14/10 and sample 7 from a mixture of diamond powders ACM 63/50 and ACM 1017. The work-pieces were heat treated at 1550° C. in vacuum and then infiltrated by liquid silicon.

Table of the properties of the as-fabricated samples are shown in Table 1 below:

TABLE 1

| | Samples | | | Properties | | | | |
|---|---|---|---|---|---|---|---|---|
| | | Heat treat-ment [min] | Diamond content decrease [wt-%] | Content, vol % | | | E-modulus [GPa] | Electrical resistivity [mOhm-m] | Final porosity [vol.-%] |
| No. | Initial material | | | D | SiC | Si | | | |
| 1 | ACM 28/20 | 3 | 16 | 47 | 32 | 21 | 550 | 0.28 ± 0.01 | 0.06 |
| 2 | ACM 28/20 | 10 | 19 | 46 | 39 | 15 | 580 | 1.03 ± 0.02 | 0.09 |
| 3 | ACM 28/20 | 20 | 22.5 | 43 | 45 | 12 | 580 | 1.79 ± 0.02 | 0.09 |
| 4 | ACM 28/20 | 30 | 25 | 41 | 49 | 10 | 580 | 1.88 ± 0.02 | 0.12 |
| | | | | | | | | | Density [kg/m³] |
| 5 | ACM 10/7 | 3 | 23 | 45 | 50 | 5 | 638 | — | 3300 |
| 6 | 60 wt % 63/50 40 wt % 14/10 | 3 | 8 | 65 | 21 | 14 | 660 | — | 3280 |
| 7 | 60 wt % 63/50 40 wt % 14/10 | 3 | 12 | 62 | 31 | 7 | 718 | — | 3340 |

Thus the experiment demonstrates that by controlling process parameters and material composition, materials with targeted properties can be obtained. Especially the decrease of the silicon content in the materials results in increase of the electrical resistivity. The electrical resistivity of the material is on a par with the corresponding semiconductor materials. The material has sufficient electrical conductivity and it makes possible to use electro-erosion machining for additional machining of the material, for instance. The electrical resistivity was measured by Four-Probe method. Furthermore, as can be seen, the E-modulus may be varied over a wide range. By changing the small diamonds ACM 14/10 in sample 6 to even smaller diamonds ACM 10/7 in sample 7, it is possible to increase the E-modulus even more.

Example 2

Infiltration by Dipping in Molten Silicon

A mixture is formed of diamond powder ACM 10/7 and ethyl alcohol added in amount of 10 wt-%. The mixture is stirred thoroughly and passed through a screen with the mesh size of 200 μm. Forming of a sample, of length 50 mm with rectangular cross section area 6×5 mm is made by pressing in a metallic mould with a force about 45 kN, at room temperature. The green body is removed from the mould and kept at room temperature for 3 hours. The work-piece contains 100 wt-% of diamond and has a porosity of 42 vol.-%. Heat treatment of the work-piece is carried out in a medium of argon, at a pressure of 800 mmHg and at 1550° C. during 4 min. The heat treatment decreases the diamond concentration in the intermediate body by 22 wt-%. Note that the temperature and time of the heat treatment are chosen so that the silicon is totally melted but first after the completion of the work-piece heat treatment. Infiltration of the intermediate body is made by dipping it into molten silicon at 1550° C.

The resulting polycrystalline body is practically nonporous (<1 vol-%) with length of 50 mm and a rectangular cross section area 6×5 mm, i.e. the size and shape is not changed within the accuracy of measuring technique (±0.001 mm). The final body contains diamond particles bonded by a matrix of silicon carbide and silicon (45 vol-% diamond, 48 vol-% SiC, 7 vol-% Si) with a density of 3.28 g/cm³. The three-point bending strength is 400 MPa and was measured on as-fabricated samples without any machining or polishing.

Example 2A

Infiltration with Silicon Alloys

Five work-pieces of φ=20 mm and h=2 mm were produced of diamond powder ACM 63/50 in a similar manner as the steps 1–3 of Example 1. The porosity of the produced work-pieces was 44 vol-%. The heat treatment of the work-pieces was carried out at temperature of 1550° C. during 4 minutes. The produced intermediate bodies were infiltrated by silicon and silicon alloys, as shown in Table 2 below:

TABLE 2

Figure 6A:
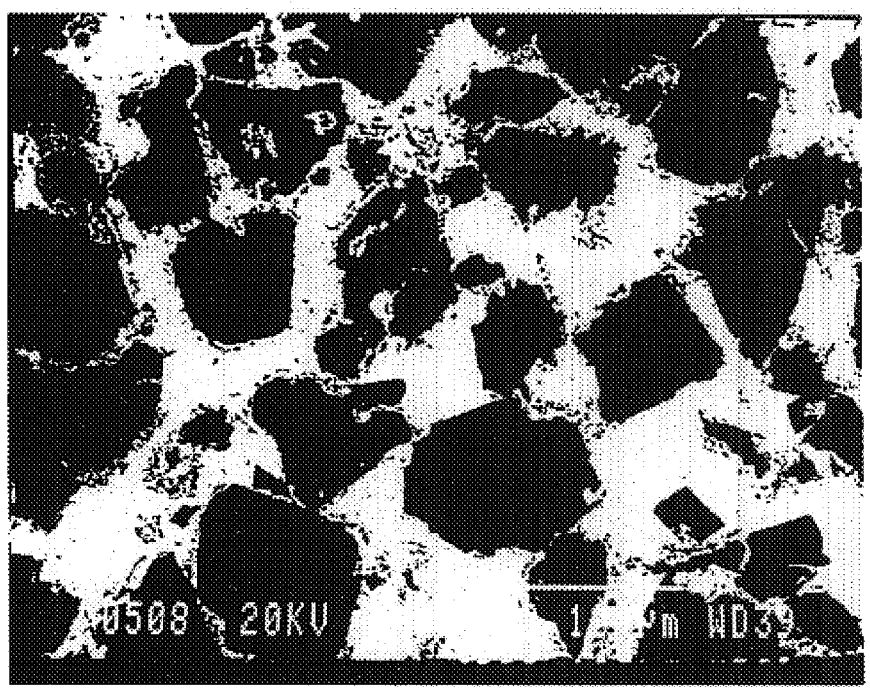
FIGS. 6a to 6d show scanning electron micrograph pictures of four different samples, produced by infiltration of different silicon alloys.
Figure 6B:
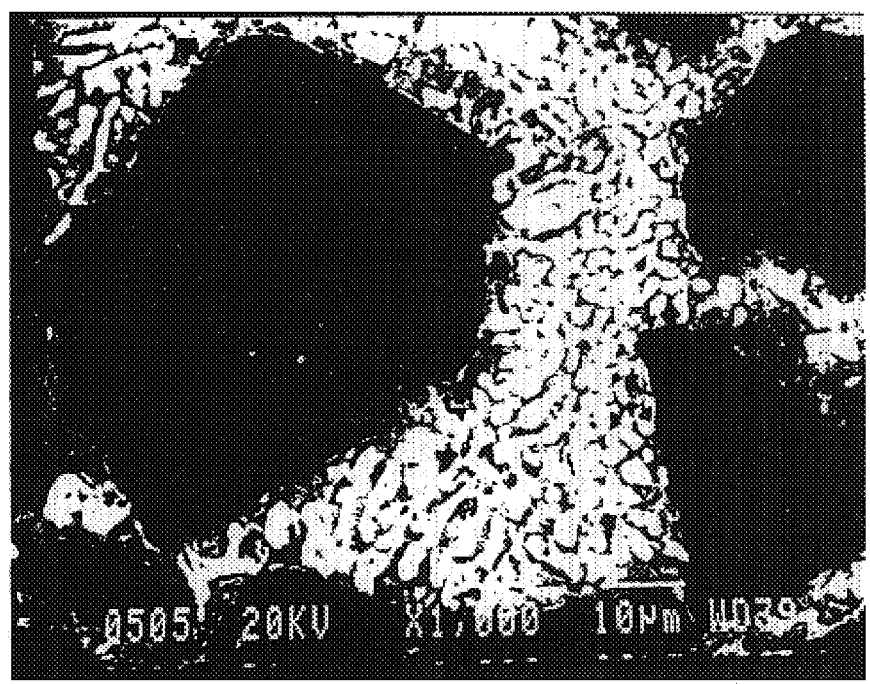
Figure 6C:
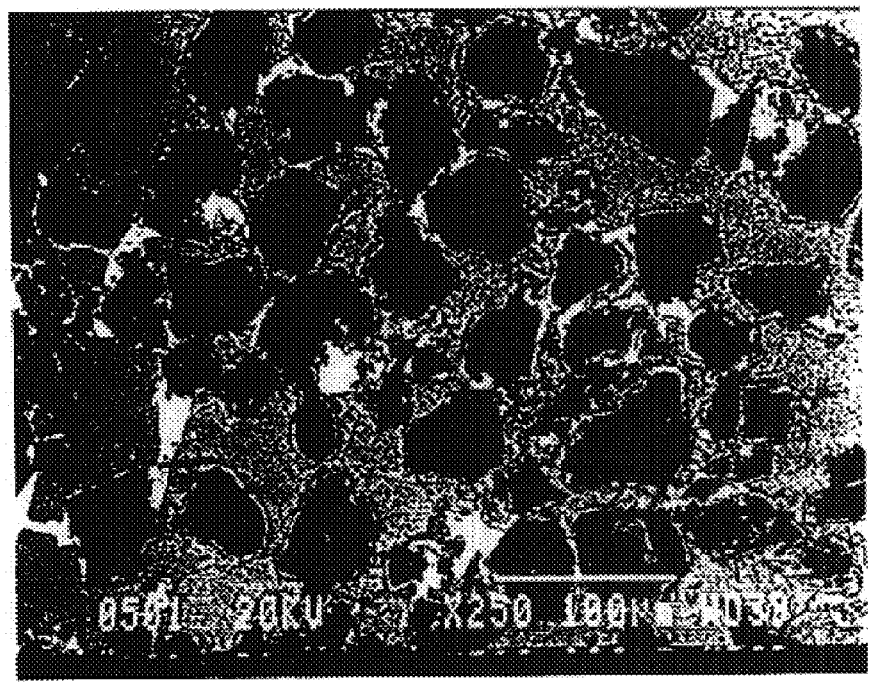
Figure 6D:
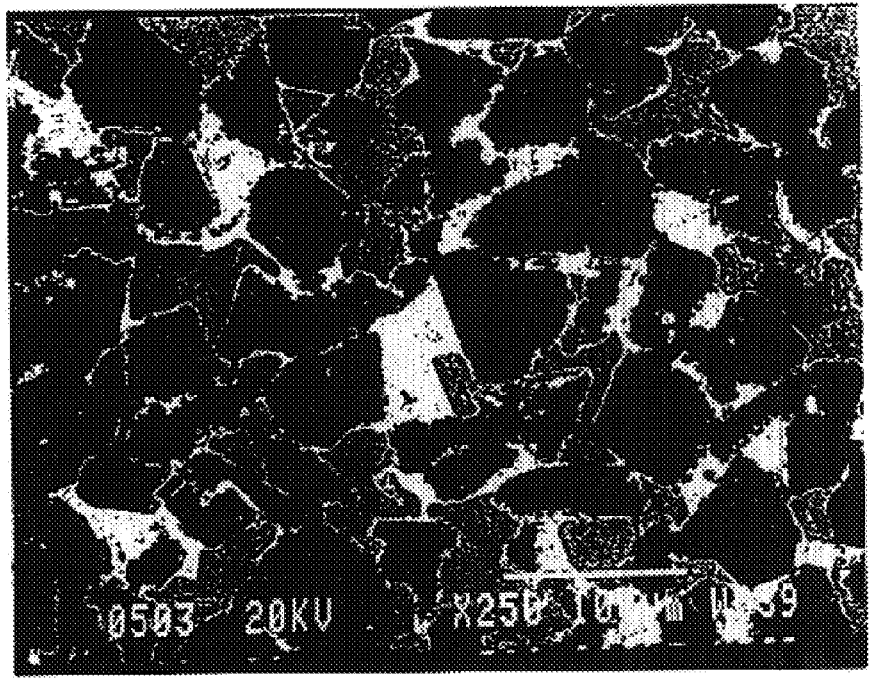

| No. | Alloys for infiltration | Content of alloying element in Silicon alloy | Infiltration temperature [° C.] | Strength [biaxial strength, MPa] | Picture of microstructure |
|---|---|---|---|---|---|
| 1 | Pure Si | — | 1550 | 115 | — |
| 2 | Si—B | 6.9 | 1550 | 113 | FIG. 6a |
| 3 | Si—Ti | 16.4 | 1550 | 162 | FIG. 6b |
| 4 | Si—Cu | 23.5 | 1400 | 148 | FIG. 6c |
| 5 | Si—Ni | 23.8 | 1400 | 136 | FIG. 6d |

The infiltration temperature was 1550° C. for samples 1–3, and 1400° C. for sample 4 and 5. Bending strength measurements have shown that the use of silicon alloys compared with pure silicon can for instance increase bending strength of produced composites. For instance Si-Ti, Si-Cu, and Si-Ni alloys can increase the bending strength by up to 40%.

The microstructure of the produced materials is shown in FIGS. 6a–d. Both fracture surface and some polished sections of the samples were examined in a JSM-840 scanning electron microscope.

FIG. 6a. shows a back-scatter SEM picture of a polished surface of sample 2 (350×). Grey areas around diamond particles (dark) in the picture illustrate B-rich areas, consisting most probably of boron carbide, and white areas illustrate the SiC phase.

FIG. 6b. shows a back-scatter SEM picture of the polished surface of sample 3 (1000×). White areas are Ti-rich islands in a grey SiC matrix surrounding the dark diamond particles. The location of the Ti-rich phase, having some distance from the diamond particles, and the co-structure (similar to an eutectic structure) between SiC and Ti-rich phase suggested that the Ti-rich phase could be titanium silicide ($TiSi_2$).

FIG. 6c. shows a back-scatter SEM picture of the polished surface of sample 4 (250×). Pure Cu can be seen as white areas around dark diamond particles and inside dark gray SiC. Cu shows a tendency of accumulating around diamond particles, probably due to the fine wetting property of liquid Cu to diamond.

FIG. 6d. shows a back-scatter SEM picture of the polished surface of sample 5 (250×). Almost the same phenomenon as above could be observed in samples with Ni content. Dark diamond particles are covered by a white Ni-rich phase.

Example 3

Measurement of the Thermal Stability, E-modulus and Specific Rigidity

Sample no. 1 is produced of diamond powder ACM 10/7, sample no. 2 is produced of diamond powder ACM 14/10, sample no. 3 from diamond powder ACM 28/20 and sample no. 4 from a mixture of diamond powders ACM 63/50 and ACM 10/7. Bars were formed of size 5×6×50 mm from the diamond powders using a temporary binder. The workpieces were heat treated at 1550° C. in vacuum and then infiltrated by liquid silicon.

The density, Young's modulus and thermal stability were measured and the specific rigidity, H, calculated using the ratio: $H=E/(\rho*g)$ where E=Young's modulus, $\rho$=density and g=9.8 m/sec², gravitational factor (see table).

Thermal stability was studied by sequential heating of the samples in vacuum at temperatures 1200°, 1300°, 1400°, 1500°, 1600° C. during 45 min. The Young's modulus and shape of the samples were tested at room temperature after each heat treatment. The stability temperature for keeping the Young's modulus is here defined as the maximum temperature where the Young's modulus will not change more than 4% from the initial value after heat treatment. The stability temperature for keeping of the shape is here defined as the maximum temperature where the shape of the samples is unchanged and where the samples will not crack.

Table 3 illustrates the properties of the as-fabricated samples:

The results shows that the produced materials have a unique thermal stability: they keep their properties up to 1500° C., that is by 300–400° C. higher than for other diamond polycrystalline materials, see source 2). Thus, the produced material can be used in high temperature conditions. The table shows also that the materials have excellent rigidity that is much higher than properties of known materials.

Where source 1 is: G. G. Gnesin. Oxygenless ceramic materials, Kiev Technology, 1987, p.139–142.

Source 2 is: A. A. Shulzhemko, Polycrystalline materials on the basis of diamond, Kiev, 1989.

Example 4

Measurement of the Bending Strength

Sample 1 is made of diamond powder ACM 14/10 and sample 2 of ACM 28/20. Sample 3 is made of a mixture of diamond powders ACM 63/50 and ACM 10/7. Sample 4 is made of a mixture of diamond powder ACM 63/50 and ACM 28/20. Sample 5 is made of ACM 28/20.

Samples 1–5 are made according to the example 3, but sample 1–4 as circular plates: ($\phi$=20 mm, h=2 mm) and sample 5 was produced as a bar for measurement of the three-point bending strength.

Table 4 shows the properties of the as-fabricated samples:

TABLE 4

| Sample | Initial diamond powder | Material composition [vol %] | Density [kg/m³] | $\sigma_{bend\ biaxial}$ [MPa] |
|---|---|---|---|---|
| 1 | 14/10 | Diamond 46 SiC 42 Si 12 | 3250 | 260 |
| 2 | 28/20 | Diamond 49 SiC 32 Si 19 | 3190 | 115 |
| 3 | 90 wt-% 63/50 10 wt-% 10/7 | Diamond 58 SiC 14 Si 28 | 3140 | 125 |

TABLE 3

| | | Properties | | | | | |
|---|---|---|---|---|---|---|---|
| Samples | | Final content | | | | Thermal stability [° C.] | |
| No. | Initial diamond Powder | Material composition [vol-%] | Density [kg/m³] | Young's modulus [GPa] | Specific rigidity H(10⁶ m) | Keeping of Young's modulus | Keeping of shape |
| 1 | 10/7 | Diamond 46 SiC 47 Si 7 | 3290 | 630 | 19.1 | 1500° C. | 1500° C. |
| 2 | 14/10 | Diamond 46 SiC 42 Si 12 | 3250 | 580 | 17.8 | 1500° C. | 1500° C. |
| 3 | 28/20 | Diamond 49 SiC 31 Si 20 | 3180 | 560 | 17.6 | 1500° C. | 1700° C. |
| 4 | 60 wt % 63/50 49 wt % 10/7 | Diamond 62 SiC 31 Si 7 | 3340 | 718 | 21.5 | 1600° C. | 1600° C. |
| Data for SiC ceramics, source 1) | | | 3100–3200 | 400–420 | 13 | — | — |

TABLE 4-continued

| Sample | Initial diamond powder | Material composition [vol %] | Density [kg/m³] | $\sigma_{bend\ biaxial}$ [MPa] |
|---|---|---|---|---|
| 4 | 80 wt-% 63/50 20 wt-% 28/20 | Diamond 57 SiC 14 Si 29 | 3120 | 136 |
| — | — | — | — | σ 3-p [MPa] |
| 5 | 28/20 | Diamond 44 SiC 48 Si 8 | 3270 | 310 |

Table 4 shows that the as-fabricated plates of the material have sufficient bending strength for applications as a construction material, for instance. The bending strength is measured on as-fabricated samples without any machining or polishing.

Example 5

Measurement of the Thermal Conductivity

All samples were produced according to example 3. Samples 1–3 are made cylindrical ($\phi$=15 mm, h=10 mm). Samples 4–8 are cylindrical ($\phi$=20 mm, h=2 mm). For used diamond powders see table 5.

The thermal conductivity of the samples was determined by measuring temperature differences on samples during transmittal of stationary thermal flow. Two radial openings of diameter 1 mm and depth 8 mm parallel to cylinder base were made in the samples 1–3, using electro-erosion. The distance between the openings was 6 mm.

Sample 9 was made from a mixture of diamond powders ACM 63/50 and ACM 14/10. The thermal expansion coefficient was measured with the use of a quartz dilatometer in the temperature range 20–100° C. The change of the linear dimensions of the sample versus increase of temperature was measured. Thus thermal expansion coefficient along the sample length was determined.

Table 5 shows the properties:

TABLE 5

| Sample | Initial diamond powder | Composition [vol-%] | | | Thermal conductivity [W/mK] |
|---|---|---|---|---|---|
| | | D | SiC | Si | 180 |
| 1 | 5/3 | 29 | 70 | 1 | 200 |
| 2 | 28/20 | 49 | 20 | 31 | 260 |
| 3 | 14/10 | 46 | 42 | 12 | 370 |
| 4 | 60 wt-% 63/50 40 wt-% 5/3 | 54 | 40 | 6 | 267 |
| 5 | 10/7 | 45 | 48 | 7 | |
| 6 | 28/20 | 47 | 32 | 21 | 259 |
| 7 | Al | — | — | — | 225 |
| 8 | Cu | — | — | — | 400 |
| Data for silicon carbide ceramics, source 1). | | — | — | — | 80–85 |
| — | — | — | — | — | Thermal expansion coefficient [×10⁶/K] |
| 9 | 60 Wt-% 63/50 40 wt-% 14/10 | 65 | 21 | 14 | 2, 2 |

The table shows that the samples made according to the present invention have excellent thermal conductivity that is much higher than of the silicon carbide ceramics, and greater than for aluminium. Sample 4, having a greater concentration of diamond, has thermal conductivity close to that of copper.

The thermal expansion coefficient of the diamond composite is very low. Where source 1 is: G. G. Gnesin. Oxygenless ceramic materials, Kiev Technology, 1987, p.139–142.

Measurement of the Biaxial Strength of Green Bodies, Work-pieces and Intermediate Bodies After graphitization and deposition of pyrocarbon, the strength of the intermediate bodies will increase, which allows machining of the intermediate bodies before Si-infiltration. In this test the biaxial strength of green bodies, work pieces and intermediate bodies were measured. Intermediate bodies consisted of pyrocarbon deposited and graphitizised bodies.

Green bodies were prepared by pressing of the diamond powders. Work-pieces were prepared by heating the green bodies in vacuum at 1000° C. in 20 minutes to remove binders. The intermediate bodies were prepared by graphitization at 1550° C. for 3–30 minutes and deposition of up to 5 wt.-% pyrocarbon at 850° C., or in different order.

The samples can be divided into nine groups depending on their treatment. Two types of samples (different diamond particle sizes) were prepared for each group. Five samples of each combination of treatment and particle sizes were tested and the results are presented as mean values.

The mean biaxial strength is shown in Table 6:

TABLE 6

| Sample | Diamond particle size [μm] | Sample treatment procedure | $\sigma_{biax}$ [Mpa] |
|---|---|---|---|
| | | Green Bodies: | |
| 1–2 | 5 to 28 | Green bodies by pressing | 1.1–1.4 |
| | | Work-pieces: | |
| 3–4 | 5 to 28 | Work-pieces heated at 1000° C. | 2.8–3.4 |
| | | Intermediate bodies: | |
| 5–18 | 5 to 28 | Graphitization 3–30 min and deposition of pyrocarbon. | 2.3–12.9 |

As can be seen from the table the strength of the work-pieces were significantly higher (about 2 times) than that of the initial green bodies. Deposition of pyrocarbon is an effective method to increase the sample strength, and can be used both after and before graphitization. In summary, the result shows that intermediate bodies of good mechanical strength can be obtained, which allows machining before Si infiltration.

Example 7

Thermal Shock Resistance

A preliminary test was done on the thermal shock resistance. The sample was heated to 1000° C. in air and then it was put directly in water (quenched) of room temperature. The sample shape remained the same and no fractures were observed.

In a second similar test the strength after thermal shock was measured. A sample of the size 5×6×50 mm, was prepared of ACM 14/10 diamond particles. The sample was heated to 500° C. and then put in room temperated water.

The following examination with optical microscopy did not reveal any cracks or defects on the surface. The same procedure was done and similar results was obtained after heating to 800° C. After this, the sample was heated to 1100° C. and quenched. This time the optical microscopy showed small microcracks on the sample surface. The 3-point-bending strength was measured to about 38 MPa, which is much lower than the original strength.

EXAMPLES OF TECHNOLOGICAL TESTS

The following different diamond types were used for preparation of samples, which were tested:

EMBS 30/40 mesh natural diamond particles, SDB 1025 30/40 mesh, synthetic diamond crystals, SDB 1125 30/40 mesh synthetic diamond crystals and DEBDUST 30/40 mesh natural ovalised diamonds, all from De Beers Co. 30/40 mesh is equal to diamond particles in the size range of 420–600 μm.

Diamond micropowders ACM 10/7 (size range 7–10 μm), ACM 14/10 (size range 10–14 μm), ACM 28/20 (size range 20–28 μm), ACM 40 (particle size less than 40 μm), ACM 63/50 (size range 50–63 μm) and A-800/630 natural diamond particles (size range 630 800 μm,) all from Superhard Materials Institute, Kiev, Ukraine.

Example 8

Dressing Tool Tests—Comparison of the Wear resistance

With this example we will show that we can control the properties by the choice of diamond type, diamond quality, particle sizes and particle size distribution:

The dressing conditions were: $V_{wheel}$=35 m/sec, $S_{lengthwice}$=0.8 m/min, $S_{cross}$=0.02 mm/turn.

The samples were tested for dressing of different Russian abrasive wheels (diameter 600 mm and width 63 mm) of the following types:

600×63×305 14A40II CM1 6K7II (electrocorundum wheel, soft to medium); 600×63×305 14A40II CT3 7K5 (eletrocorundum wheel, medium to hard); 600× 63×305 14A25II CM2 6K5 (electrocorundum wheel, soft to medium); 600×63×305 14A40II CT3 37K5 (electrocorundum wheel, medium to hard) and 600× 63×305 63C40II CM1 6K7 (green silicon carbide wheel, soft to medium).

Dressing Tool Test no 1.

Samples 1–11 were tested against a reference composite material, <<Slavutich>> (with diamonds of the type A-800/630 in a matrix of cemented carbide) from Superhard Materials Institute, Kiev, Ukraine.

Sample Preparation:

See Table 8A below for diamond types used for the preparation of the samples and the relation between the different types. All samples are produced from mixtures of very large (>420 μm) and finer diamonds.

Diamond types used, mass ratios of the different diamond particles and size ratio are shown in Table 8A:

TABLE 8A

| Sample | Larger diamonds | Finer diamonds | PyC content | Mass ratio: Large/Fine | Ratio of mean particle size: Large/Fine |
|---|---|---|---|---|---|
| No. 1 | A-600/630 | ACM 10/7 | — | 6/10 | 84 |
| No. 2 | A-800/630 | ACM 14/10 | — | 6/10 | 60 |
| No. 3 | EMBS 30/40 mesh | ACM 14/10 | 5% | 12/10 | 43 |
| No. 4 | EMBS 30/40 mesh | ACM 28/20 | — | 12/10 | 21 |
| No. 5 | EMBS 30/40 mesh | ACM 10/7 | — | 6/10 | 60 |
| No. 6 | EMBS 30/40 mesh | ACM 10/7 | — | 12/10 | 60 |
| No. 7 | EMBS 30/40 mesh | ACM 10/7 | — | 23/10 | 60 |
| No. 8 | SDB 1025 30/40 mesh | ACM 10/7 | — | 12/10 | 60 |
| No. 9 | SDB 1125 30/40 mesh | ACM 10/7 | — | 12/10 | 60 |
| No.10 | SDB 1125 30/40 mesh | ACM 10/7 | — | 6/10 | 60 |
| No.11 | DEBDUST 39.49 mesh | ACM 10/7 | — | 6/10 | 60 |

A binder (20% water emulsion of poly(vinylacetate) PVAC) is added to the diamond mixtures for samples 1–2 (the amount of the mass of dry PVAC is 1 wt % of diamond mass). A binder (25% alcohol solution of phenol formaldehyde resin) is added to the diamond mixtures for samples 3–7, 10 and 11 in amount of 8% of the mass of diamonds (that is equal to 2 wt.-% of dry resin). Ethyl alcohol is added to the diamond mixtures for samples 8 and 9 in amount of 10 wt-%.

All the mixtures were thoroughly stirred, mixtures for samples 1–2 were sieved through a screen of mesh size 1.5 mm, and mixtures for samples 3–11 were sieved through a screen with mesh size of 1 mm. The forming of all samples is done by pressing using a metallic mold at room temperature with a force of 15 kN. The pressed bodies are removed from the mold. The samples are cylindrical with diameter of 10 mm and height of 10 mm. Samples 1–2 dried at 70° C. for 1 hour. Samples 3–7, 10 and 11 are left in air at room temperature for 10 hours with subsequent drying at 70° C. for 1 hour and hardening at 150° C. for 1 hour. Samples 8 and 9 are kept in air, at room temperature for 3 hours to evaporate the temporary binder, ethyl alcohol. The samples 1–2 were heat treated during 4 minutes at 1550° C. in vacuum (pressure of 0.1 mmHg). Pyrocarbon was added up to 5 wt-% at 870 C to samples 3–4. The graphitization of the samples 3–11 is done in vacuum (at pressure of 0,1 mmHg) at 1550° C. for 3 minutes. The decrease in the diamond content in the produced intermediate bodies is 8–14 wt-%.

All samples were infiltrated at 1550° C. by liquid silicon when the silicon placed on the intermediate body surface starts to melt.

The final bodies 1–2, 3–7 and 11 comprises very large particles of natural diamond bonded by a matrix formed by finer diamond particles, silicon carbide and silicon. The final bodies 8–10 comprises the same except that the large diamond particles are synthetic.

The final body compositions are shown in Table 8B:

TABLE 8B

| Sample | Larger diamonds [vol.-%] | Finer diamonds [vol-%] | SiC [vol-%] | Si [vol. = %] | Calculated hardness of matrix: |
|---|---|---|---|---|---|
| No. 1 | 25 | 34 | 35 | 6 | 57 |
| No. 2 | 25 | 36.6 | 30.6 | 7.8 | 60 |
| No. 3 | 37.5 | 30.1 | 14.1 | 18.3 | 57 |
| No. 4 | 37.5 | 27.8 | 26.6 | 8.1 | 57 |
| No. 5 | 25 | 33.5 | 34.7 | 6.8 | 57 |
| No. 6 | 37.5 | 23.9 | 27.7 | 10.9 | 51 |
| No. 7 | 50 | 16.2 | 21.0 | 12.8 | 45 |
| No. 8 | 37.5 | 23.9 | 27.7 | 10.9 | 51 |
| No. 9 | 37.5 | 23.9 | 27.7 | 10.9 | 51 |
| No.10 | 25 | 33.5 | 34.7 | 6.8 | 57 |
| No.11 | 25 | 32.6 | 34.2 | 8.2 | 57 |

The calculated hardness of matrix was obtained assuming a diamond hardness of 100GPa, a silicon carbide hardness of 25GPa and a silicon hardness of 10GPa.

Samples 1–4 were tested for dressing of abrasive wheels of the type 600×63×305 14A40II CM1 6K7II as shown in Table 8c below:

Relative consumption of large diamond particles [mg large particles/kg abrasive wheel]:

TABLE 8C

| Sample | Initial diamonds (+ pyrocarbon content) | Medium relative consumption of test sample [mg/kg] | Medium relative consumption of larger diamonds [mg/kg] |
|---|---|---|---|
| Sample 1 | A-800/630 + ACM 10/7 | — | 0.66 |
| Sample 2 | A-800/630 + ACM 14/10 | — | 0.63 |
| Sample 3 | EMBS 30/40 mesh + ACM 14/10 (+5% pyC) | 1.91 | 0.78 |
| Sample 4 | EMBS 30/40 mesh + ACM 28/20 (+5% pyC) | 1.59 | 0.59 |
| Slavutich | A-800/630 | — | 2.16 |

Thus, the wear resistance of the bodies produced by the given example is about 3 times greater than the wear resistance of <<Slavutich>>material.

The samples 5–9 were tested for dressing of abrasive wheels of the type 600×63×305 14A25II CM2 6K5 as shown in Table 8D below:

Relative consumption of large diamond particles [mg large particles/kg abrasive wheel]:

TABLE 8D

| Sample | [mg/abrasive kg] |
|---|---|
| Sample 5 | 0.52 |
| Sample 6 | 0.54 |
| Sample 7 | 0.72 |
| Sample 8 | 0.60 |
| Sample 9 | 0.45 |
| Slavutich | 1.5 |

The wear resistance of the samples is about 2–3 times greater than the wear resistance of the Slavutich material.

By choosing samples from the test, with small diamonds of the same size and types and large diamonds of the same size and type, i.e. samples of same conditions, it is possible to see how the silicon content affects the wear resistance of the body.

By comparing the samples 5, 6 and 7 we can see a trend between the silicon content and the calculated hardness and also the wear resistance of the matrix (consisting of small diamonds, silicon carbide and silicon), see Table 8E below. The calculated hardness values correspond with the measured overall hardness 57–61 GPa (see example 12).

TABLE 8E

| Sample | Larger diamonds | Finer diamonds | Si content of matrix [vol-%] | Si content of composite [vol-%] | Calculated hardness of matrix: | Wear resistance |
|---|---|---|---|---|---|---|
| No. 5 | EMBS 30/40 mesh | ACM 10/7 | 9 | 6.8 | 57 | 0.52 |
| No. 6 | EMBS 30/40 mesh | ACM 10/7 | 17 | 10.9 | 51 | 0.54 |
| No. 7 | EMBS 30/40 mesh | ACM 10/7 | 26 | 12.8 | 45 | 0.72 |

Sample 5 with the best wear resistance also has the highest calculated matrix hardness and lowest silicon content. By comparing sample 8 and 9 with the same small diamond type (ACM 10/7), same calculated matrix hardness (57GPa) but with different large diamonds, SDB 1025 and SDB 1125 respectively, we can see that the better quality of sample 9 diamonds gives a better wear resistance.

The samples 10–11 were tested for dressing of abrasive wheels of the type i) 600×63×305 14A40II CT3 37K5 and ii) 600×63×305 63C40II CM1 6K7 as shown in Table 8F:

Relative consumption of large diamond particles [mg large particles/kg abrasive wheel]:

TABLE 8F

| Sample | Wheel type i [mg/abrasive kg] | Wheel type ii [mg/abrasive kg] |
|---|---|---|
| Sample no. 10: | 1.57 | 2.31 |
| Sample no. 11: | 1.07 | 2.16 |
| Slavutich: | 4.13 | 13.2 |

The wear resistance of the bodies 10–11 is 2.5–3.5 times greater than for the Slavutich material at dressing of wheels of medium hardness. At dressing of green silicon carbide wheels they are 6 times greater.

Dressing tool test no. 2

Sample 1 was made according to dressing tool test no. 1, using diamonds of type EMBS 30/40 mesh and ACM 14/10. As reference material dressing tools, samples 2–3, from WINTER company (Ernst Winter & Sohn Diamantwerkzeuge GmbH & Co., Norderstedt, Germany) were tested. Sample 2-WINTER PRO 88 D601 H770 (diamonds in cemented carbide matrix) Sample 3-WINTER PRO 88 D711 H770 (diamonds in cemented carbide matrix)

The samples 1–3 were tested for dressing of abrasive wheel of the type 600×63×305 14A40II CT3 7K5. The duration of the test was 20 minutes. 3% $Na_2CO_3$ emulsion was used as coolant. The results are shown in Table 8G below:

TABLE 8G

| Sample | The relative consumption of large diamonds [mg large particles/kg abrasive wheel]: |
|---|---|
| Sample 1 | 0.9 |
| Ref. sample 2 | 6.4–6.6 |
| Ref. sample 3 | 4.0–12.0 |

The wear resistance of the sample produced according to the invention is about 4–10 times greater than the wear resistance of the reference materials.

Example 9

Microstructure Analysis:

The specification of the dressing tools used for the microstructure analysis are shown in Table 9:

TABLE 9

| Sample | Content/Name | Dimension (mm) | Matrix |
|---|---|---|---|
| 1 | A-800/630 25 vol % ACM 14/10 75 vol % | φ = 8 h = 7.5 | SiC + Si |
| 2 | PRO88 D601 H770 | φ = 8 h = 7.9 | Cemented WC |

The grinding surfaces of two samples were observed with a JSM-840 scanning electron microscope (SEM). Both samples were dense, and contained large diamonds with 400–800 sum particle sizes. The surface of the sample no. 2 was quite rough and several diamond particles had been pulled out from the matrix. There were some scratches on the surface, which might arise from the diamond particles that had fallen out. The surface of the sample no. 1 was flatter than that of the sample no. 2. No diamond particles were pulled out from the matrix, which indicates that the diamonds are strongly bonded to the matrix.

Example 10

Abrasion Test, Erosion Test and Hot Steel Sliding test

These following tests show the strong bonding between the diamond particles and the matrix:

Two diamond composites were evaluated in an abrasion test, an erosion test and a test with sliding against hot steel. Sample 1 was made with 60% of diamond powder ACM 63/50 and 40% ACM 10/7. Sample 2 was made with diamond particles ACM 14/10.

The following reference materials were used. All the standard materials are available on the commercial market and the data given for these here are Data Sheet information:

Ref. 1: Alumina from Sandvik Coromant AB, grade AZ96, containing 2.8 wt. % zircon. Hardness of 1820 HV and a fracture toughness of 5.4 $MN/m^{3/2}$.

Ref. 2: Reaction bonded (Si infiltrated) silicon carbide from Goodfellow, labeled SiSiC, with about 10% free silicon. Hardness of 2500–3000 $kgf/mm^2$. No specified fracture toughness.

Ref. 3: Pure silicon carbide, from Matenco AB, labeled SiC. Hardness of 2000 HV and a fracture toughness of 3.8 $MN/m^{3/2}$.

Ref 4: Cemented carbide from Sandvik AB, grade H6M, with 1.3 $\mu$m particles of WC in 6 wt.-% Co. Hardness of 1720 HV and fracture toughness of 10.1 $MN/m^{3/2}$.

Ref 5: Polycrystalline diamond (PDC) on cutting tips of T-MAX U from Sandvik Coromant AB.

Abrasion with a Diamond Slurry

A crater grinding technique was used. Spherical craters are produced on sample surfaces by rotating a stainless steel wheel with a rounded rim against the rotating sample. An abrasive medium, a particle slurry is added. The combined motions of the wheel and the sample result in a spherical crater ground into the sample surface. A steel wheel of 20 mm diameter and a load of 20 g was used. The abrasive was of 4 $\mu$m mono-crystalline diamonds mixed with a commercial standard liquid (Kemet type 0) to a concentration of 25 g/l. The volumes of the craters were measured with an optical profilometer and the removed volume per sliding distance was calculated.

Due to the large difference in wear resistance of the materials, different total sliding distances were chosen for the materials. The diamond composites, sample 1–2, were tested for 30.000 revolutions (corresponding to 1861 m of sliding); the polycrystalline diamond (PDC) was tested for 8000 revolutions (500 m); the ceramics were tested for 800 revolutions (50 m) and the cemented carbide for 600 revolutions (38 m). By varying the total number of revolutions, the final wear scar diameters were kept between 1–2 mm. At least five craters were produced on each sample. The measurement results are illustrated in Table 10A:

TABLE 10A

| Material | Average crater diameter μm | Revolutions | Abrasion rate μm³/m |
| --- | --- | --- | --- |
| Sample 1; ACM 63/50 + ACM 10/7 | 1.04 ± 0.10 | 30.000 | 0.85 ± 0.14 |
| Sample 2; ACM 14/10 | 1.11 ± 0.14 | 30.000 | 2.49 ± 0.20 |
| PCD | 0.48 ± 0.02 | 8000 | 26.9 ± 0.15 |
| SiSiC | 1.64 ± 0.03 | 800 | 274.2 ± 12.7 |
| SiC | 1.38 ± 0.03 | 800 | 279.8 ± 5.6 |
| AZ96 | 1.82 ± 0.04 | 800 | 530.8 ± 10.4 |
| H6M | 1.80 ± 0.02 | 600 | 693.9 ± 18.7 |

Both diamond composites exceeded most reference materials in terms of abrasion resistance with more than two orders of magnitude (about 100 times better) and even the PCD ten times. Comparing the diamond composites, the sample containing only one particle size 10/14 was worn about three times as fast as the sample of two particle sizes 50/63–7/10.

Figures 1, 7A:
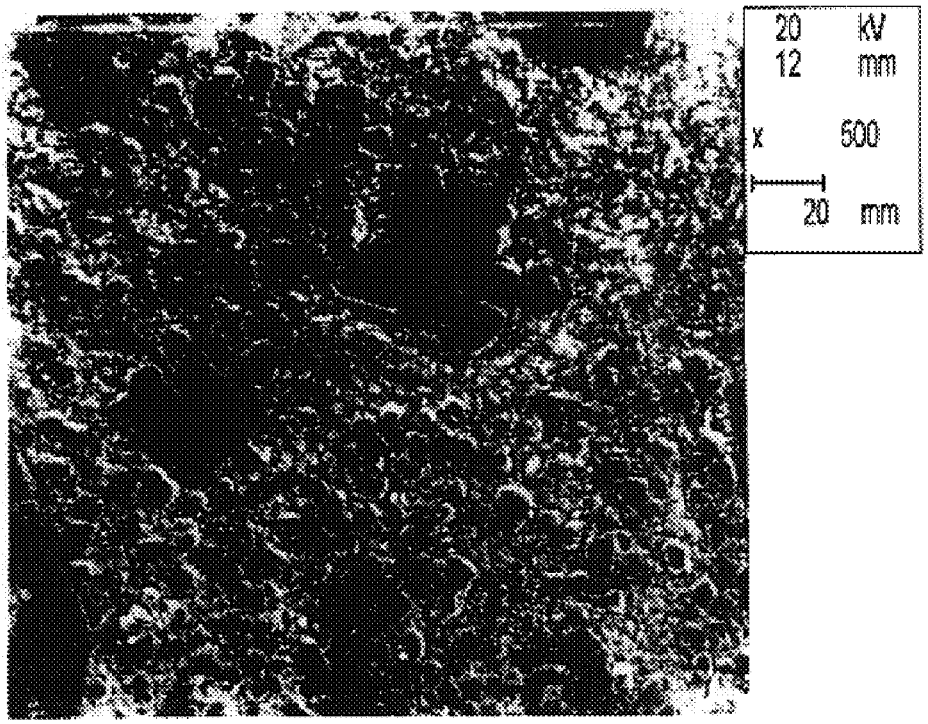
Figures 2, 7A:
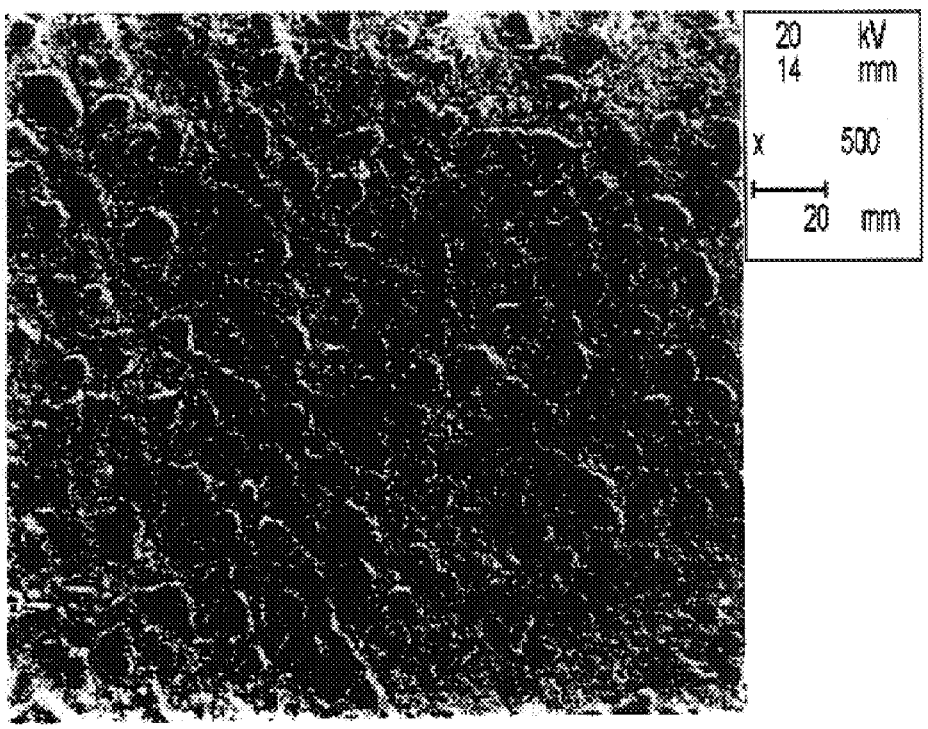

Scanning electron micrographs of the abraded surfaces of the sample 1 and 2 showed that most diamonds were still firmly held by the matrix. Grooves from the abrasion were not a common feature on these surfaces. The matrix seemed to have been removed around the large diamonds, leaving the diamonds protruding from the surface. In particular the large diamonds in the 50/63-7/10 material showed flat, polished-like surfaces. No signs of fracturing, pulling out or crushing of the diamond phase could be seen. See FIGS. 7A1 and A2 for scanning electron micrographs A1) for sample 1 and A2) for sample 2.

The abraded surfaces of the PCD material revealed preferential removal of an intergranular phase, presumably a metal binder, followed by falling out of the diamond particles. The wear scars of all other reference materials contained abrasion grooves, together with other types of damage. They also showed local small scale fracture, presumably at grain boundaries.

It is believed that the dominant wear mechanism of diamond composites is the removal of the matrix followed by whole diamonds as the support from the matrix disappears; the large diamond phase is thus more difficult to remove from the surface than the small diamond phase. This could explain the superior performance of the sample I compared to sample 2.

Dry Particle Erosion Resistance

The test was made in a centrifugal equipment. Batches of specific amounts of erosive are added into a container and fed at a continuous rate into the center of a rotating disc. The erosive is slung radially through channels in the disc due to centrifugal forces and hit the samples mounted at the periphery at fixed angles in relation to the stream of erosive. The tests were done with 80 mesh (200 μm) silicon carbide erodents with a hardness of about 2500 HV. The impact angles were 45° and 90° and the impact velocity of the erosive particles was 93 m/s. The samples were masked leaving an area of 8.5×8.5 mm unprotected. The weight loss of each sample per mass of impacting erodents was measured by weighing the samples before testing and after four specific intervals of exposure to erosion. For 1000 g charge of erosive each sample was hit by 10.8970 g and 7.1265 g for the impact angles 90° and 45° respectively. The erosion rates were calculated from slopes of the curves describing the mass loss of the samples per impacting mass of erodents.

The results are shown in Table 10B:

TABLE 10B

| Material | Impact angle | Average material loss mg | Erosion rate mg/g |
| --- | --- | --- | --- |
| Sample 1; | 90° | 0.9 | 0.08 |
| ACM 50/63 + ACM 10/7 | 45° | 0.5 | 0.07 |
| Sample 2; | 90° | 2.2 | 0.21 |
| ACM 10/14 | 45° | 1.2 | 0.17 |
| SiSiC | 90° | 16.3 | 1.50 |
|  | 45° | 7.8 | 1.10 |
| SiC | 90° | 6.5 | 0.63 |
|  | 45° | 2.2 | 0.34 |
| AZ96 | 90° | 14.7 | 1.35 |
|  | 45° | 6.3 | 0.88 |
| H6M | 90° | 13.5 | 1.24 |
|  | 45° | 6.3 | 0.88 |

The diamond composites, sample 1 and 2, performed better than the reference materials. For most reference materials the diamond composites were about one order of magnitude (about 10 times) better. Sample 2 (ACM 14/10) was however only a few times better than the best references (SiC and H6M), particularly in 45 erosion.

Normal impact erosion consistently resulted in higher wear rates than the 45° erosion, which is in agreement with the experience from brittle materials see source 3). However the difference in erosion rates between the two angles of impingement was relatively low for the diamond composites, in particular for sample 1.

Where source 3 is: Jacobson and S. Hogmark, "Tribologi", Karlebo förlag, 1996).

Scanning electron micrographs of the eroded surfaces of the diamond composites showed that both the diamonds and matrix are clearly visible. In contrast to abraded surfaces, signs of spalling or fracture can be seen here, in particular for the large diamond particles. The diamonds seem to adhere well to the matrix, though. There are no signs of removal of whole diamonds in the composite or of total crushing of the diamond phase. Instead a continuous wear-down of the particles and the matrix together seem to be the dominant wear mechanism.

Eroded surfaces of the silicon carbides revealed large amounts of fracture over the whole eroded surface. Small-scale fracture seems to be the dominant wear mechanism. The alumina AZ96 revealed signs of both fracture and ductile indentation, whereas the cemented carbides seemed to be worn by a more ductile mechanism not resulting in much traces of fracture on the surfaces.

Test Regarding Properties in Dry Sliding Against Hot Steel

Only the diamond composites were evaluated in this test. 5 mm wide composite rods were pressed by hand with loads of about 50–100 N, against the rim of a rotating stainless steel (AISI 316) heated to temperatures between 600° and 950° C. with an acetylene-oxygen flame. The steel was 600 mm in diameter and about 40 mm wide and it was rotated at about 10 rpm. Before the test the wheel rim was ground clean from scales. The composite rods were pressed against the glowing steel wheel for periods up to one minute. The test was repeated a number of times with the aim of producing observable wear scars.

The test did not result in any noticeable material removal from either of the composites. At higher temperatures around 900° C., steel sometimes tended to be smeared onto the composite. At these temperatures the steel was also easily cut away from the wheel, using the composite pieces as cutting edges. The scanning electron micrographs after hot steel sliding did not reveal any changes of the surfaces.

In an additional test against the rotating steel wheel heated to about 900° C., the composite was alternatively pressed for about 2–3 minutes and then ground against 220 mesh SiC abrasive paper. This procedure was repeated ten times at different locations of the rods. It was not possible to achieve any significant material removal by this additional test.

Example 11

Turning Test; Turning of Al—Si 390

Four diamond-SiC—Si composites, samples 1–4, were evaluated in unlubricated continuous cutting, by performing turning tests with an aluminium-silicon alloy as working material. The materials were characterized in terms of tip wear after a specific turning sequence and with scanning electron microscopy micrographs.

Sample 1 was produced from diamond particles ACM 5/3, sample 2 of ACM 10/7, sample 3 of ACM 40 and sample 4 of ACM 63/50. The samples tested were 3×12×4 mm bodies with all comers orthogonal. The composites had relatively sharper edges, with radii varying between about 0.01 and 0.1 mm.

As reference materials two commercial cutting tool inserts from Sandvik Coromant AB were used: Polycrystalline diamond (PCD), from the T-MAX U series, labelled CCMW 09 T3 04F, CD10 and a cemented carbide (CC) cutting insert labelled CCMW 09 T3 04. These inserts had a tip angel of 80°, a clearance angle of 5° and a tip radius of 0.4 mm.

The cutting tests were performed in a lathe. As working material, a 270 mm long cylinder with a radius of 200 mm of aluminium silicon alloy labelled Al—Si 390 was used. The Al—Si 390 work pieces were mounted in the chuck, with one end left free. The cylinder surfaces were initially cleaned from scales by removing a couple of mm from its diameter. The machining was performed at the cylinder ends by feeding the inserts towards the axis of rotation. The cutting depth was 0.25 mm the feeding rate 0.5 mm per revolution and the rotational speed 1000 rpm, giving a maximum sliding speed of about 10 m/s. The composite bodies were tilted an angle of 4 to simulate the clearance angle of the commercial inserts.

The removed projected area of the tip after ten cuts was used as a value of the tip wear. The tips were evaluated with scanning electron microscopy (SEM). One or two such ten-cut sequences were performed on each material. The wear was measured on SEM micrographs using image analysis for the area measurements.

Since the composites had much sharper nose (smaller nose radii) than the commercial inserts of PDC and CC, additional tests were performed with 5/3 and 40 on blunt noses resulting from the first 10 run sequences, which gave nose radii of about 0.2 mm.

Results

All composites, sample 1–4, could be used for turning of the Al—Si 390 alloy.

Fracture of a cutting tip occurred once for the 10/7 composite, but whole tests runs were performed on other sharp corners of this body without fractures. All the composites performed much better than the conventional cemented carbide (a factor of about four in the measured removed areas), but the PCD diamond was better than any of the composites, as shown in Table 11 below.

TABLE 11

Results from turning tests

| Material | Removed area 1st run [mm$^2$] | Removed area 2nd run [mm$^2$] |
| --- | --- | --- |
| Sample 1–5/3 | 0.05 | 0.04 |
| Sample 2–10/7 | 0.06 | — |
| Sample 3–40 | 0.04 | 0.04 |
| Sample 4–63/50 | 0.05 | — |
| CC | 0.14 | 0.17 |
| PCD | 0.01 | 0.008 |

The scanning electron micrographs of the cutting tips after cutting showed that the wear of the tips resulted from a continuous wear down and rounding of the cutting tips.

It can be concluded that dry, continuous cutting by turning can be performed with the evaluated composites on Al—Si 390. The composites are tough enough to resist this kind of stresses and, although the geometry of the composites was far from optimized for the operation, they comply with the PCD diamond cutting insert, and are much better than a conventional cemented carbide.

The differences in cutting tip shape between the samples 1–4 and the commercial inserts is unfortunate, since this makes a comparison between the two unfair. Presumably, composites with an optimized geometry (as for the PCD inserts) would perform even better.

Example 12

Hardness Measurements

The Vickers hardness and Knoop hardness of the composites was measured. The samples are made according to example 3. Sample 1 is made of ACM 5/3 diamond powder and sample no 2 is made of ACM 10/7. Before the test the samples of dimensions 12×12×5 mm, were ground and polished by a standard technique for hardness measurements. Flat samples were obtained, but they were not fully polished because the material was extremely hard.

Vickers hardness of a selected area was measured using Microhardness tester MXT-α1. The standard formula for Vickers hardness calculation:

$$Hv=0.47P/a^2 \qquad (Eq\ 4),$$

where P is the load and a is the half length of the indent diagonal. Knoop hardness of a random area was measured using INSTRON 8561 and calculated directly by:

$$H_k=P/S \qquad (Eq\ 5),$$

where P is the load and S is the projected area. According to the design of Knoop indenter, the ratio of the long diagonal to the short diagonal is 7:1. Here the ratio of the long diagonal to the short diagonal in the indent was almost 10:1, indicating that the cutting tools have high elastic modulus.

Table 12A of Vickers hardness of diamond/SiC/Si cutting tools:

TABLE 12A

| Materials | Load (N) | 2a (μm) | Hv (GPa) | Indent Place |
|---|---|---|---|---|
| Sample 1 | 5 | 17 | 32.5 | Between diamond particles |
| 5/3 μm | 20 | 30.8 | 39.6 | Between diamond particles |
| | 20 | 32.3 | 36.0 | Between diamond particles |
| | 20 | 29 | 44.7 | Between diamond particles |
| | 20 | 23.9 | 65.8 | Diamond particles |
| | 20 | 28.3 | 47.0 | Diamond particles |
| | 20 | 26 | 55.6 | Diamond particles |
| Sample 2 | 20 | 34.5 | 31.6 | Between diamond particles |
| 10/7 μm | 20 | 33 | 34.5 | Between diamond particles |
| | 20 | 33.5 | 33.5 | Between diamond particles |
| | 20 | 28.5 | 46.3 | Between diamond particles |
| | 20 | 25.5 | 57.8 | Diamond particles |
| | 20 | 27 | 51.6 | Diamond particles |
| | 20 | 25.8 | 56.5 | Diamond particles |
| | 20 | 27 | 51.6 | Diamond particles |

Table 12B Knoop hardness of diamond/SiC/Si cutting tools:

TABLE 12B

| Samples | Load (N) | Long diagonal (μm) | Short diagonal (μm) | $H_k$ (GPa) |
|---|---|---|---|---|
| Sample 1 | 20 | 82.9 | 8.5 | 56.8 |
| 5/3 μm | 20 | 84.1 | 8.5 | 56.0 |
| | 30 | 125 | 13 | 36.9 |
| | 30 | 114.9 | 12.1 | 43.2 |
| Sample 2 | 20 | 84.2 | 7.9 | 60.1 |
| 10/7 μm | 20 | 86.4 | 8.1 | 57.2 |

It can be concluded from the tables that the Vickers hardness of the microstructure depends on the measured area. The Vickers hardness in the area between the diamonds was 30–40 GPa, and in the diamond particle area 50–60 GPa, i.e. the micro-zones are very hard.

As seen from the table there are some differences between the Knoop hardness of sample 1 and sample 2, 37–57 and 57–60 GPa respectively. The smaller diamonds are graphitized faster which reduces the relative diamond content in sample 1 more than in sample 2. This shows the importance of choosing correct size of diamonds. The overall material hardness reflected by the Knoop hardness measurements show that the composites belongs to the group of superhard materials (>40 GPa). All measurements showed good repetition.

Table 12C of typically reported ranges of Knoop hardness for some materials:

TABLE 12C

| Material | Knoop hardness [GPa]* |
|---|---|
| Diamond particles | 80–120 |
| Polycrystalline diamond, PCD/PDC | 65–80 |
| Cubic boron nitride, CBN | 35–45 |
| Boron carbide | 25–35 |
| Aluminum oxide | 15–22 |
| Silicon carbide | 21–30 |
| Tungsten carbide | 17–22 |

*)Depending on the crystallographic direction.

Example 13

Investigation of D—SiC—Si Composites and Metal Brazing Processes

Experiments on brazing the diamond composites to the surface of steel and cemented carbide have been done with the main goal to estimate the possibility to connect the composites to metal by brazing. The brazing was done using Cu—Ti based alloys.

The experiments shows that the diamond composites are wetted by alloys of the chosen metals and that they can be brazed to steel and cemented carbide. Some difficulties were observed when brazing diamond composites to steel. The adhesion of the sample to metal is very high and observed cracks are likely to be connected with thermal stresses caused by large differences in thermal expansion coefficients.

| Sample | D-SiC | Cemented carbides | Steels |
|---|---|---|---|
| Thermal expansion coefficient | 2 | 4–6 | 17 |

Example 14

Coating of D-SiC—Si Composites with a Diamond Film

The D/SiC/Si samples made according to the present invention were successfully diamond coated.

The depositions Conditions: Standard hot filament CVD reactor, Tantalum filament, 2300° C., substrate maintained at ~900° C., H2/CH4 ratio 1%, Total gas flow 200 sccm, pressure 20 Torr, giving a diamond deposition rate of ~0.5 μm h-1, with crystallite size typically 1–2 μm.

Surface pre-treatment: Manual abrasion with 1–3 μm diamond grit, although this proved unnecessary for most of these substrates since their surfaces were already sufficiently rough.

Studies on cross-sections by microscopy-techniques reveal no debonding or cracks and mechanical scratch-tests shows that the coatings are very well adhered.

The original surface of composites having a bimodal particle size distribution of larger diamonds and small diamond in a SiC/Si matrix (where the larger where slightly above the matrix because of mechanical pre-treatment). It was found that a fine grained diamond coating nucleated and was grown between the larger diamonds forming a nice continuous film. So, the diamond coating has partially planarized the surface, with the matrix being completely coated, but with these large particles still protruding out of the now diamond-coated surface to a height of approximately 5 μm.

EXAMPLES OF FIELDS OF APPLICATION

The composite material made according to the present invention is advantageous for applications where the combination of different superior properties are needed: The stated properties make the proposed material valuable for such applications as fine instrument-making, including devices which operate under rapid thermal cycles, wear resistant products for mechanical engineering (nozzles for sand-blasting machines, products for mud pumps) size-stable supports for devices etc. At operations with impacts, for instance milling and turning of unsymmetrical objects and at operations where the composite tool is exposed to vibrations there are higher requirements placed on the material regarding the toughness. At punching operations the hardness and the wear resistance of the material is important. A high E-modulus gives mechanical stability at applications requiring size accuracy.

A high thermal conductivity of the composite tool is important at operations where a lot of frictional heat is produced in the contact area.

At such applications where the material being in contact with the composite is aimed to be unchanged, for instance when used as bearings or similar, size gradient materials are useful. The area near the contact zone should have diamond sizes giving the highest possible wear resistance and the rest of the composite sizes giving the optimal mechanical properties, strength and toughness. Another interesting application field is sawing and turning of wood and stone etc. where a high abrasive ability is combined with sufficient toughness.

Yet another application is dressing pencils and bars replacing single-crystal diamond dressing tools, diamond needles, and tools intended for shape dressing of grinding disks of complex profiles. It is also possible to produce drills; saw components for machining of concrete, granite, marble; other construction materials and machining tools.

The composite material produced according to the present invention is also suitable to use as substrates for growing diamond films. See example 14. The technique of creating crystalline diamond-coatings using activated low-pressure gases is well known. This offers the potential for using a component surface with a diamond coating in a range of applications. However, to fully use the advantage of such a coating it has to be well bonded to the substrate material, without cracks or defects and preferably very fine-grained. Most engineering materials suitable as substrates will not fulfil the requirement of acting as nucleating agent for a dense fine-grained film, and the thermal expansion coefficient mismatch is not low enough to avoid stresses and cracks at the interface or in the diamond coating when cooling from the reactor temperature. The diamond-silicon carbide-silicon composites fulfil the requirements of acting as good nucleation agent for diamond film growth, having a low thermal expansion coefficient mismatch and an extremely good bound between the composite and diamond film. It is possible to grown diamond films on composite materials for a number of wear-parts applications. The film thickness should be larger than 3 $\mu$m, preferably larger than 10 $\mu$m, in most abrasive applications. Such coated composites will be especially useful in cutting tools and bearings, where polished surfaces can be obtained with standard techniques such as rotating hot iron- or steel-wheels. The extraordinary good performance is a combination of the diamond coating and the strong, wear-resistant composite. A locally abrasive damage through the diamond coating will not cause any drastic or catastrophic change of the good properties of the component.

METHOD SPECIFICATIONS

The properties of the claimed material were determined by the following methods.

Density was determined by a hydrostatic weighing method, based on determination of sample mass in air and in water. Apparent density, which is a ratio of porous body mass ($m_1$) to a volume of space occupied by it, including volume of all pores in the material, is determined by the formula: $\rho = m_1 \times \rho_{H2O}/(m_2-m_3)$, where $m_2$: mass of sample saturated with water, $m_3$: mass of weights balancing the sample saturated with water when weighing it in water, g, $\rho_{H2O}$–density of water, kg/m³.

Thermal conductivity was measured with calorimeter using samples of $\phi$=15 mm and height=10 mm having radial openings at different heights for the placing thermocouples. Thermal conductivity was calculated as a ratio of thermal resistance to a distance between thermocouples. The thermal resistance was determined as the temperature drop of samples at steady-state thermal flow through it. The calculations were made taking in account of corresponding constants of the device. The certified measurement error is ±10%.

Three-point bending at room temperature in as-received shape (without polishing).

Loading rate-300 N/sec.

Strength ($\sigma_{3p}$) is calculated by the formula: $\sigma 3Pl/2bh^2$ where P is fracture load (N), l is length between supports (40 mm), b is width of sample (6 mm), h is thickness of sample (5 mm).

Biaxial bending test is a ring-on-ring test where the loading fixture consist basically of two concentric rings. The stress field is biaxial with principal directions in the radial and tangential directions. The biaxial strength ($\sigma$biax) of four samples was calculated by: $\sigma_{biax}=3P/4\pi t^2[2(1+i)\ln(r_s/r_1)+(1-i)(r_s^2-r_1^2)/R^2]$ where P is fracture load (N), t is sample thickness (mm), i is the Poisson's ratio (0.2), $r_s$ is radius of the support ring (7 mm), R is radius of the sample, $r_1$ is radius of the loading ring (3.13 mm).

Young's modulus is measured in the direction of axis of a sample with length 50 mm and cross-section 5×6 mm by exciting and recording of resonance frequencies of longitudinal oscillations of the sample at room temperature. Young's modulus is calculated by the formula: $E=(\rho/k_4)\times(2l\times f_4/4)^2$, where E is dynamic Young's modulus, Pa, l is length of sample (0.05 m), $k_4$ is the correction factor equal to 0.98, $\rho$ is the density of material, kg/m³, $f_4$ is resonance frequency, Hz, which corresponds to $3^{rd}$ ober-tone (usually—500–600 kHz)

Electrical conductivity of was measured using samples of the size 5×6×50 mm along the whole sample length by Four-Probe method. The voltage drop between two internal probes was measured while external probes conducted current through the sample.

We claim:

1. A body in which diamond particles are bonded to a matrix of silicon carbide, said body comprising at least 20 vol-% of diamond particles, at least 5 vol-% of silicon carbide, and silicon or metal-silicon-carbon or boron-silicon-carbon phases, the Young's modulus exceeding 450 Gpa, wherein each diamond particle is coated with a layer of the silicon carbide having a thickness of at least 50 nm, wherein the diamond particles have one size fraction of particles being larger than 50 $\mu$m and one size fraction of particles having a size of 50 $\mu$m at the most, the mass ratio of the one size fraction to other fractions falling in the range of 0.25 to 2.5 and the mean particle size of all particles being larger than 10 $\mu$m.

2. The body according to claim 1, said body comprising at least 29 vol-% of the diamond particles, at least 14 vol-% of the silicon carbide, and the Young's modulus exceeding 540 GPa.

3. The body according to claim 1, wherein said silicon, metal-silicon-carbon, or boron-silicon-carbon phases comprises metal carbides, boron carbides, metal silicides, boron silicides, alloys of metals with silicon, or silicon.

4. The body according to claim 1, wherein said metal is at least one metal from the group consisting of Ti, Zr, Hf, V, Nb, Ta, Cr, Mo, W, Mn, Re, Co, Ni, Cu, Ag, Al, Ge.

5. The body according to claim 1, wherein the metal content does not exceed 30 wt-%.

6. The body according to claim 5, wherein the metal is chosen from the group of V, Nb, and Ta, and the metal content is less than 10 wt-%.

7. The body according to claim 5, wherein the metal is chosen from the group of Mo and W, and the metal content is less than 5 wt-%.

8. The body according to claim 1, wherein diamond particles of sizes of about 10 $\mu$m or less are embedded and included in the matrix, the Vickers microhardness of the matrix measured in an area between diamond particles being greater than 30 GPa for a load of 20 N, and the Knoop macrohardness of the matrix being greater than 36 GPa for a load of 20 N.

9. The body according to claim 1, wherein the body is hollow.

10. The body according to claim 1, wherein a surface of the body is coated with diamond film.

11. A body in which diamond particles are bonded to a matrix of silicon carbide, said body comprising at least 20 vol-% of diamond particles, at least 5 vol-% of silicon carbide, and silicon or metal-silicon-carbon or boron-silicon-carbon phases, the Young's modulus exceeding 450 Gpa, wherein each diamond particle is coated with a layer of the silicon carbide having a thickness of at least 50nm, wherein the diamond particles have one size fraction of large diamond particles and one size fraction of small diamond particles, the mass ratio falling in the range of 0.25 to 2.5 and the mean particle size being larger than 10 $\mu$m, the abrasion rate being less than 26 $\mu$m$^3$/m, and the erosion rate being less than 0.34 mg/g.

12. The body according to claim 11, where the diamond particles have sizes less than 20 $\mu$m.

13. The body according to claim 11, wherein the large diamond particles have a size larger than 20 $\mu$m, the small diamond particles have sizes less than 20 $\mu$m; and the body comprises 20–99 vol-% of the silicon carbide, and 1–30 vol-% of the silicon, metal-silicon-carbon, or boron-silicon-carbon phases; the matrix hardness being 20–63 GPa.

* * * * *